United States Patent
Omata et al.

(10) Patent No.: US 11,423,749 B2
(45) Date of Patent: Aug. 23, 2022

(54) SURVEILLANCE CAMERA

(71) Applicant: PANASONIC I-PRO SENSING SOLUTIONS CO., LTD., Fukuoka (JP)

(72) Inventors: Akito Omata, Fukuoka (JP); Hirokazu Tasaka, Fukuoka (JP); Yusuke Mamiya, Fukuoka (JP); Masashi Nakamura, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 197 days.

(21) Appl. No.: 16/802,952

(22) Filed: Feb. 27, 2020

(65) Prior Publication Data
US 2021/0272432 A1 Sep. 2, 2021

(51) Int. Cl.
*G08B 13/196* (2006.01)
*G08G 1/04* (2006.01)
*G03B 17/08* (2021.01)
*G08B 29/04* (2006.01)
*G08G 1/017* (2006.01)

(52) U.S. Cl.
CPC ....... *G08B 13/19619* (2013.01); *G03B 17/08* (2013.01); *G08B 13/1963* (2013.01); *G08B 29/04* (2013.01); *G08G 1/017* (2013.01); *G08G 1/04* (2013.01)

(58) Field of Classification Search
CPC .......... G08B 13/19619; G08B 13/1963; G08B 29/04; G03B 17/08; G03B 15/03; G08G 1/017; G08G 1/04; H04N 5/2256; H04N 5/2252
See application file for complete search history.

(56) References Cited

FOREIGN PATENT DOCUMENTS

JP          2008-158659         7/2008
JP          2008158659    A  *  7/2008

* cited by examiner

*Primary Examiner* — Yogesh K Aggarwal
(74) *Attorney, Agent, or Firm* — Greenblum & Bernstein P.L.C.

(57) ABSTRACT

A surveillance camera is equipped with a capturing unit to capture a subject; an illumination unit that applies illumination light to the subject; a main body that is approximately formed in a cuboid that is long in a top-bottom direction and has an internal housing space that is partitioned by a partition plate into a lower space that houses the capturing unit and an upper space that houses the illumination unit; a visor that projects from a front surface of the main body so as to be inclined forward and covers a light-receiving space formed in front of the capturing unit; and a water repelling portion that is formed in step form in a tip portion of the visor.

8 Claims, 22 Drawing Sheets

FIG. 2
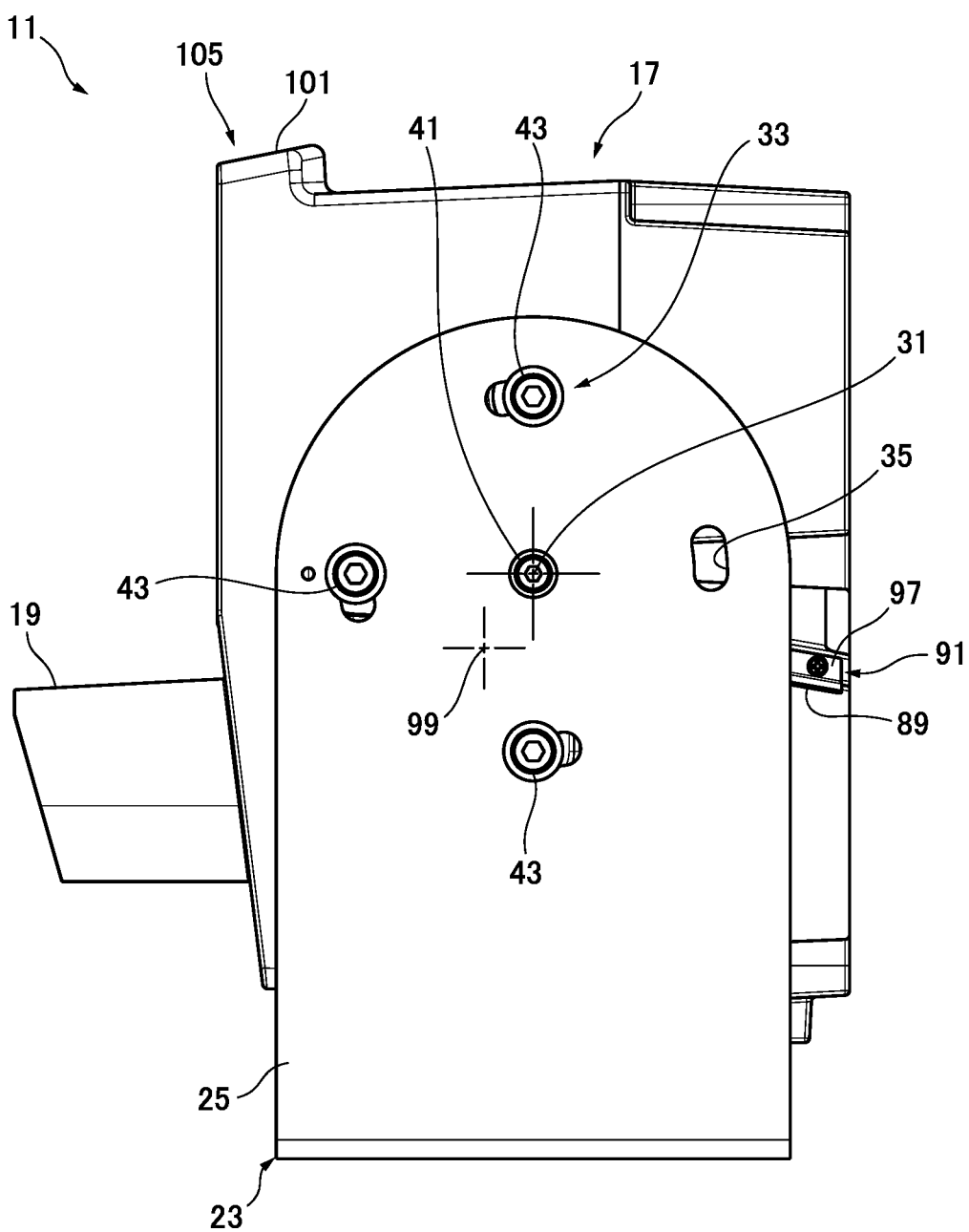
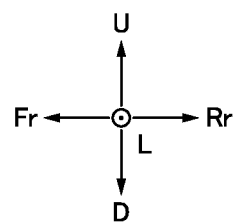

FIG. 3
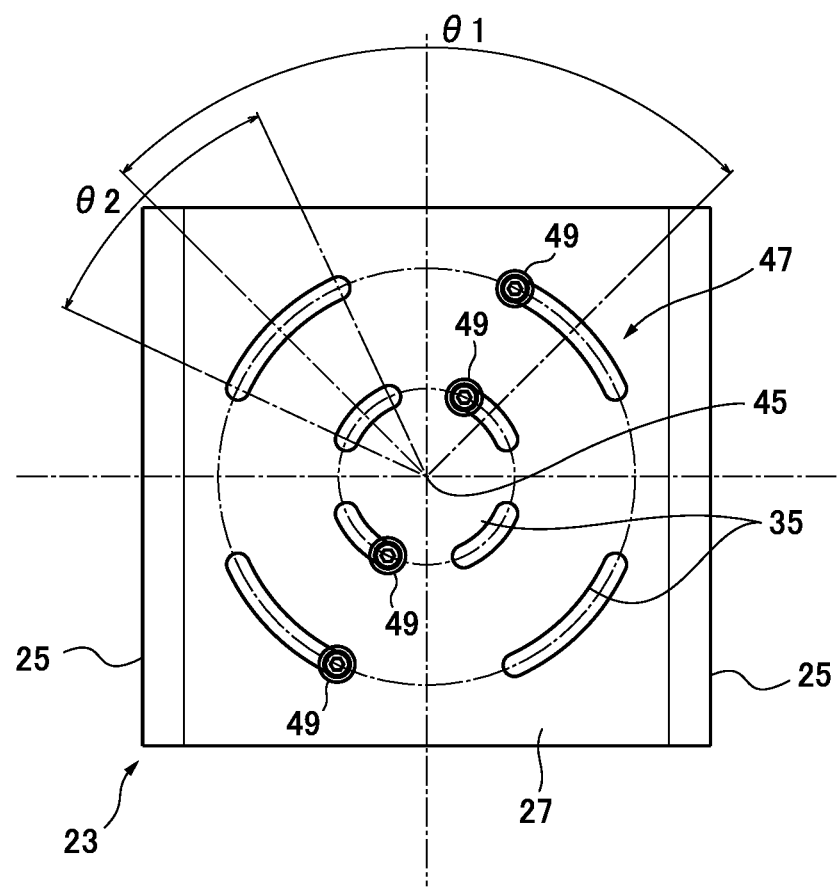
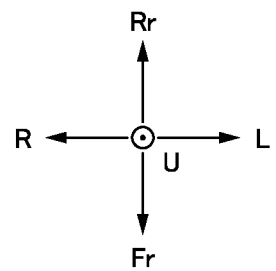

SURVEILLANCE CAMERA

BACKGROUND OF THE INVENTION

1. Field of the Invention

The present disclosure relates to a surveillance camera.

2. Background of the Art

A vehicle imaging apparatus is known that is simple in configuration and makes it possible to recognize a license plate and to image a driver with high image quality (refer to JP-A-2008-158659, for example). This vehicle imaging apparatus is equipped with a body that is installed beside a road, a camera unit for imaging vehicles running on the road through a lens provided in the body, a top illumination unit that is installed above the lens in the body and illuminates an upper illumination range, and a bottom illumination unit that is installed below the lens in the body and illuminates a lower illumination range. The body is installed in such a manner that its bottom surface is put on leg portions that are installed on an island beside a running lane (i.e., bottom-supported installation).

However, in the vehicle imaging apparatus disclosed in JP-A-2008-158659, the image quality is lowered when, for example, rain water sticks to the lens etc. The same is true of a case that the lens is covered with a glass plate. If water sticks to the lens or glass plate and dirt, dust, or the like is mixed into the water, the dirt, dust, or the like remains on the lens or glass plate as stains after evaporation of the water. Such stains obstruct passage of imaging light and lowers the image quality.

SUMMARY OF INVENTION

An object of the present disclosure is to provide a surveillance camera capable of suppressing image quality reduction.

The disclosure provides a surveillance camera comprising a camera unit; an illumination unit that applies illumination light to a subject to be imaged by the camera unit; a main body that is approximately formed in a cuboid that is long in a top-bottom direction and has an internal housing space that is partitioned by a partition plate into a lower space that houses the camera unit and an upper space that houses the illumination unit; a visor that projects from a front surface of the main body so as to be inclined forward and covers, from above, a light-receiving space formed in front of the camera unit; and a water repelling portion that is formed in step form in a protrusion tip portion of the visor in such a manner that a tip inner circumferential surface of the visor recedes from a tip outer circumferential surface of the visor in the direction opposite to projection of the visor.

The disclosure makes it possible to suppress image quality reduction in a surveillance camera.

BRIEF DESCRIPTION OF THE DRAWINGS

FIG. 2 is a side view of the surveillance camera shown in FIG. 1;

FIG. 3 is a plan view of a base portion of a mount metal fitting;

DETAILED DESCRIPTION OF THE EXEMPLARY EMBODIMENT

Specific configurations and operations of surveillance cameras according to embodiments of the present disclosure will be hereinafter described in detail by referring to the accompanying drawings when necessary. However, unnecessarily detailed descriptions may be avoided. For example, detailed descriptions of well-known items and duplicated descriptions of constituent elements having substantially the same ones already described may be omitted. This is to prevent the following description from becoming unnecessarily redundant and thereby facilitate understanding of those skilled in the art. The following description and the accompanying drawings are provided to allow those skilled in the art to understand the disclosure thoroughly and are not intended to restrict the subject matter set forth in the claims.

Background of Conception of Embodiment 1

In the vehicle imaging apparatus disclosed in JP-A-2008-158659, the top illumination unit for illuminating the driver seat of a large-sized vehicle is installed above the camera unit provided in the body and the bottom illumination unit for illuminating the driver seat and the license plate of a standard-sized vehicle is installed below the camera unit, that is, the camera unit is interposed between the two illumination units. This raises problems that the vehicle imaging apparatus is heavy and difficult to install. Furthermore, in this vehicle imaging apparatus, since the body is mounted on dedicated leg portions, a large number of installation working steps and a large installation cost as exemplified by a construction cost of the leg portions and a cost of purchasing attachment metal fittings for attaching the body to the leg portions are required. In particular, in the case of a site where a road needs to be closed when the surveillance camera is installed, there is a demand that the angle of view etc. be adjusted in a short time by simple work.

Furthermore, there is a demand for installing the surveillance camera by attaching it to a gantry (bottom-supported installation) or a backside pole (back-supported installation) rather than putting it on leg portions. In such cases, it is necessary to separately select and purchase attachment metal fittings having an adjustment mechanism. In the case of installation using a gantry, there is a demand for employing hanging installation that is possible even in a short interval between traffic signs.

A surveillance camera that can be reduced in total weight and installed easily will be described in a first embodiment.

Embodiment 1

Figure 1:
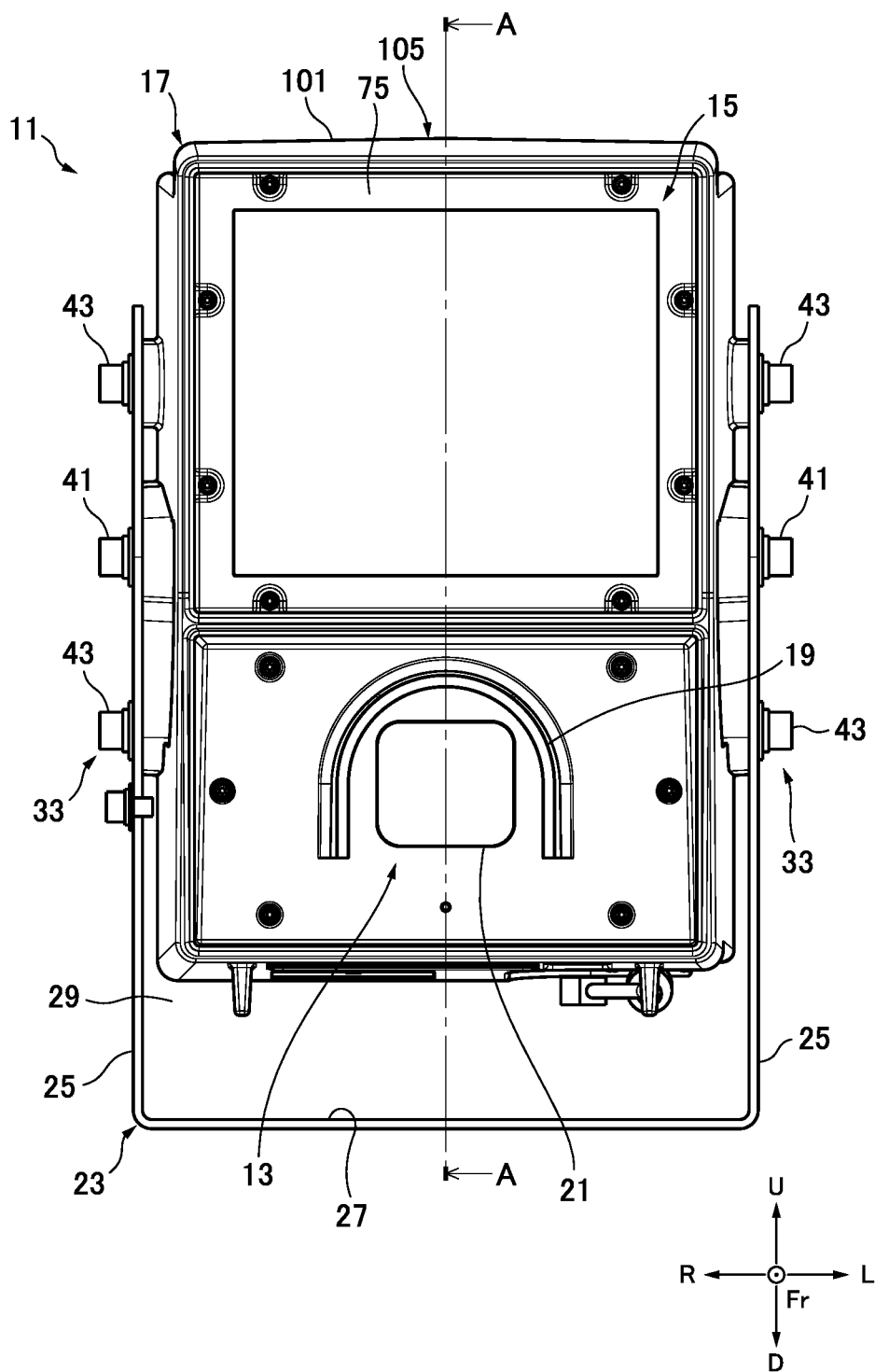
FIG. 1 is a front view of a surveillance camera according to a first embodiment.

FIG. 1 is a front view of a surveillance camera 11 according to the first embodiment.

The surveillance camera 11 images a vehicle under first imaging conditions (e.g., a long exposure time) that are suitable for imaging of the face(s) of a person(s) (e.g., driver or driver and passenger) existing in a subject (e.g., vehicle) and images the vehicle under second imaging conditions (e.g., a short exposure time) that are suitable for imaging of the license plate of the vehicle. The surveillance camera 11 can performing imaging while switching between the first imaging conditions and the second imaging conditions in a time-divisional manner.

Where the frame rate is, for example, 30 fps, the surveillance camera 11 can take an image of the vehicle under the first imaging conditions (i.e., an image including a clear image(s) of a person(s) existing in the vehicle) in odd-numbered frames (e.g., first frame, third frame, . . . , 29th frame). Also, the surveillance camera 11 can take an image of the vehicle under the second imaging conditions (i.e., an image including a clear image of a license plate) in even-numbered frames (e.g., second frame, fourth frame, . . . , 30th frame) where the frame rate is 30 fps. In this manner, for the same subject (e.g., vehicle), the surveillance camera 11 can take (generate) an image including a clear image of a person existing in the vehicle and an image including a clear image of a license plate approximately at the same time.

In this specification, the upward, downward, forward, rearward (backward), leftward, and rightward directions are defined as indicated by arrows in FIG. 1. The circle having a center dot that is drawn at the intersection of the orthogonal arrowed lines means the forward direction. The surveillance camera 11 according to the first embodiment is equipped with a camera unit 13, an illumination unit 15, and a main body 17.

FIG. 2 is a side view of the surveillance camera 11 shown in FIG. 1. The main body 17 of the surveillance camera 11 has a visor 19 which projects forward from the front surface of the main body 17. As shown in FIG. 1, the visor 19 surrounds a lens 21 (see FIG. 1) of the camera unit 13. The visor 19 is shaped like a pipe that is open at the bottom.

The surveillance camera 11 has a mount metal fitting 23 in which one end portions of a parallel pair of side plates 25 are connected to each other by a base portion 27 so as to form an approximately U shape. The space defined between the pair of side plates 25 is a holding space 29 where the main body 17 is held. Tilt shafts project from the confronting surfaces of the side plates 25, respectively. The axes of the tilt shafts are respective tilt rotation axes 31. Rotated about the tilt shafts, the mount metal fitting 23 allows the surveillance camera 11 to be fixed (installed) at its bottom, back, or top to the bottom surface (see FIGS. 2 and 8), the back surface (see FIGS. 9 and 10), or the top surface (see FIGS. 11 and 12) of the main body 17. The surveillance camera 11 is provided with tilt fixing portions 33 for fixing the angle of rotation, about the tilt shafts, of the main body 17, at the main body 17 and the side plates 25.

The tilt fixing portions 33 fix the angle of rotation between the main body 17 and the side plates 25 (i.e., tilting rotation of the side plates 25 with respect to the main body 17). Each tilt fixing portion 33 has plural arc-shaped holes 35 formed through the associated side plate 25 on a circle centered at the tilt rotation axis 31, fastening members (e.g., small tilt shaft screws) that are inserted through the respective arc-shaped holes 35, and plural threaded engagement portions 37 (see FIG. 6) that are formed in the main body 17 and threadedly engaged with the respective fastening members.

For example, four arc-shaped holes 35 are arranged in the circumferential direction at the same intervals of 90°. Each arc-shaped hole 35 is formed as a hole that is long in the circumferential direction so as to be able to move in the circumferential direction relative to the inserted fastening member. The number of arc-shaped holes 35 formed in each tilt fixing portion 33 is not limited to four (see FIG. 2).

Each fastening member is a small tilt shaft screw that is inserted through each arc-shaped hole 35 from the outside. Each tilt fixing portion 33 employed in the first embodiment requires at least four small tilt shaft screws, that is, one small tilt shaft screw 41 inserted through a tilt shaft hole 39 (see FIG. 6) and three tilt fixing screws 43 that are inserted through respective arc-shaped holes 35 at 2 places sandwiching tilt shaft hole 39. The threaded engagement portions 37 are female screw portions that are threadedly engaged with the respective small screws.

The tilt fixing portions 33 can fix the mount metal fitting 23 to threaded engagement portions 37 of the main body 17 located at such a rotation position that its base portion 27 is opposed to the bottom surface of the main body 17 (see FIG. 1).

Figure 9:
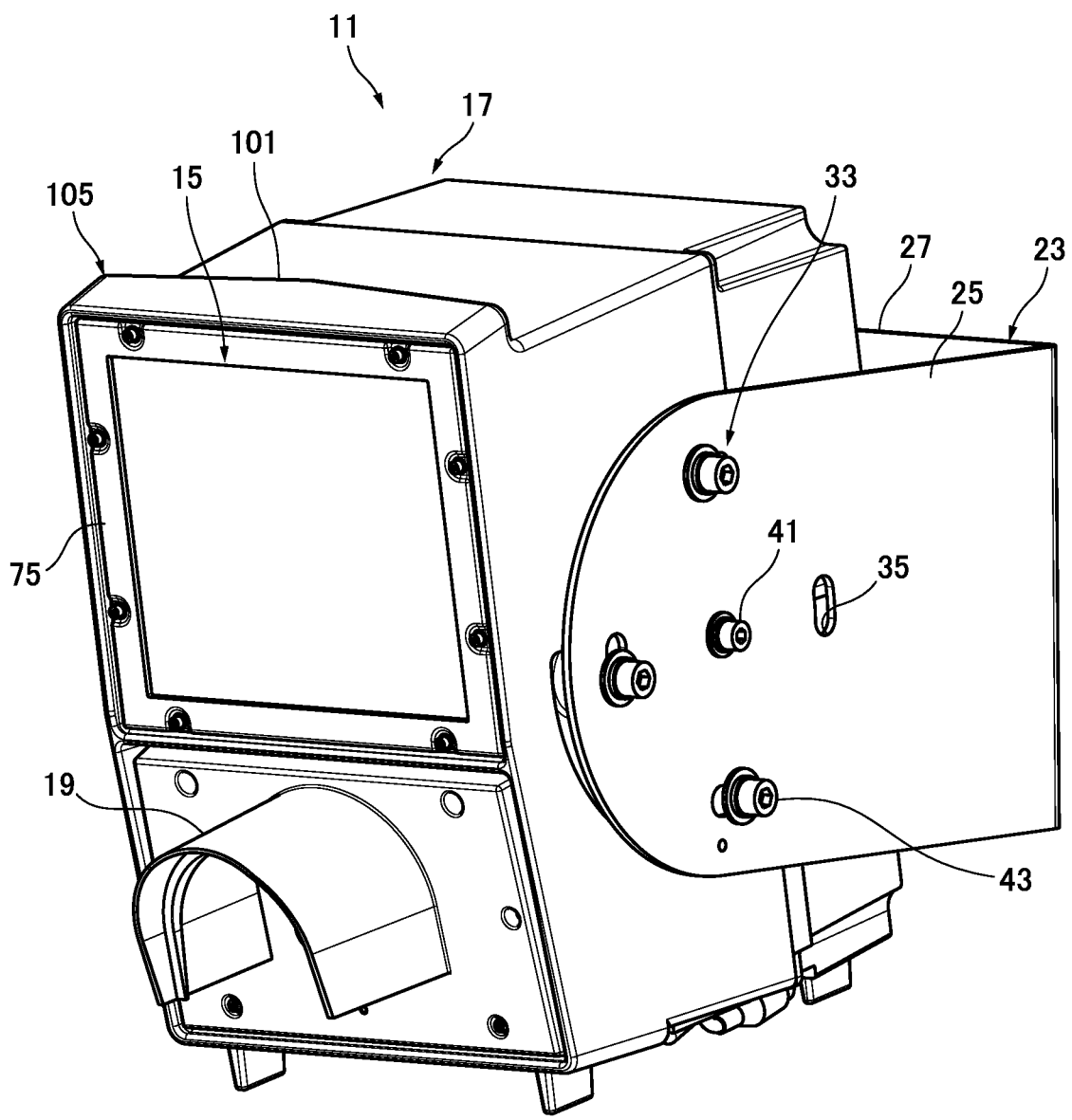
FIG. 9 is a perspective view of the surveillance camera being supported from the back side.

The tilt fixing portions 33 can also fix the mount metal fitting 23 to the main body 17 located at such a rotation position that its base portion 27 is opposed to the back surface of the main body 17 (see FIG. 9).

Figure 11:
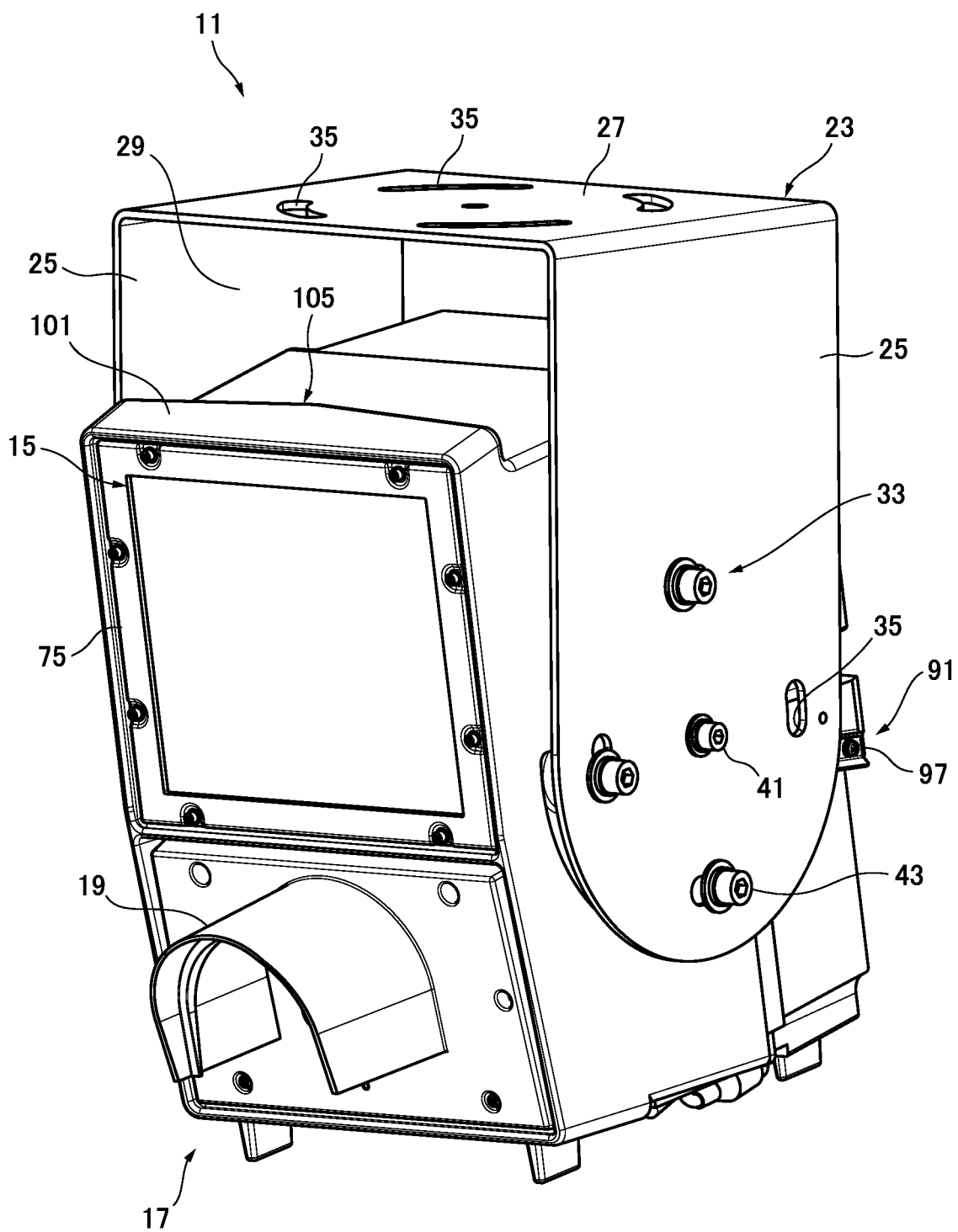
FIG. 11 is a perspective view of the surveillance camera that is hanging-installed.

Furthermore, the tilt fixing portions 33 can fix the mount metal fitting 23 to the main body 17 located at such a rotation position that its base portion 27 is opposed to the top surface of the main body 17 (see FIG. 11).

FIG. 3 is a plan view of the base portion 27. The base portion 27 of the surveillance camera 11 is supported by a plate-like platform (not shown) that is attached to a rod member (not shown) such as a gantry installed in an expressway in such a manner that a pan rotation axis 45 that is perpendicular to the base portion 27 is located at the center of the platform. The base portion 27 is provided with a pan fixing portion 47 for fixing the angle of rotation with respect to the platform.

The pan fixing portion 47 has plural arc-shaped holes 35 formed through the base portion 27 on a circle centered at the pan rotation axis 45 and fastening members that are inserted through the respective arc-shaped holes 35 and threadedly engaged with the platform. For example, four arc-shaped holes 35 are arranged in the circumferential direction at the same intervals of 90° (angle θ1). Each arc-shaped hole 35 is formed as a hole that is long in the circumferential direction so as to be able to move relative to the inserted fastening member in the circumferential direction. Each arc-shaped hole 35 is formed so as to have a length that is about 40° (angle θ2). The arc-shaped holes 35 may be arranged on plural concentric circles centered at the pan rotation axis 45.

For example, each fastening member is a small screw that is inserted through each arc-shaped hole 35. The pan fixing portion 47 requires at least two small pan fixing screws 49 that are inserted through two respective arc-shaped holes 35 between which the pan rotation axis 45 is interposed. In the first embodiment, four arc-shaped holes 35 are arranged on each of two concentric circles and hence at least four small pan fixing screws 49 are necessary in total.

The platform is provided with threaded engagement portions (not shown) to be threadedly engaged with the above four respective small screws. The platform need not be provided with threaded engagement portions in the case where the small pan fixing screws 49 are tapped ones.

In the surveillance camera 11 according to the first embodiment, the illumination unit 15 and the camera unit 13 are installed in an upper space 51 and a lower space 53 (see FIG. 6) of the main body 17, respectively, so as to be arranged in the vertical direction. In this vertical arrangement of the camera unit 13 and the illumination unit 15, the optical axis of a lens unit 55 and the illumination optical axis are located in the same vertical plane. As a result, in the surveillance camera 11, even if the main body 17 is fixed so as not to rotate about the vertical axis (pan rotation axis 45), the swing directions of the optical axis of a lens unit 55 and the illumination optical axis can be determined at the same time.

Figure 4:
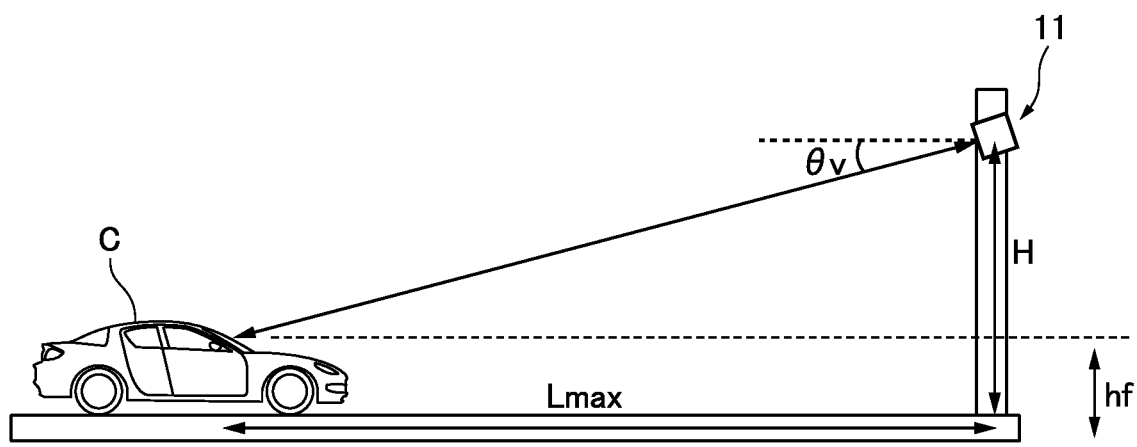
FIG. 4 is a schematic diagram showing an example installation dip angle.

FIG. 4 is a schematic diagram showing an example installation dip angle θv. The mount metal fitting 23 supports the surveillance camera 11 through the bottom, front, and back of the base portion 27 so that the surveillance camera 11 can rotate continuously. Thus, the dip angle can be adjusted finely by changing the rotation position of the main body 17 in the normal or reverse rotation direction about the tilt rotation axes 31. The surveillance camera 11 is installed at a height of 5 to 6 m from the road surface (see FIG. 4). It is assumed that the height hf of the subject (e.g., vehicle C; the center of windshield) is 1.3 mm from the road surface. The maximum horizontal distance Lm to the vehicle C is set at about 30 m. The installation dip angle θv is adjusted in, for example, a range of 7° to 14° with respect to the horizontal direction. The above values are examples and it goes without saying that these parameters are not limited to those values.

Figure 5:
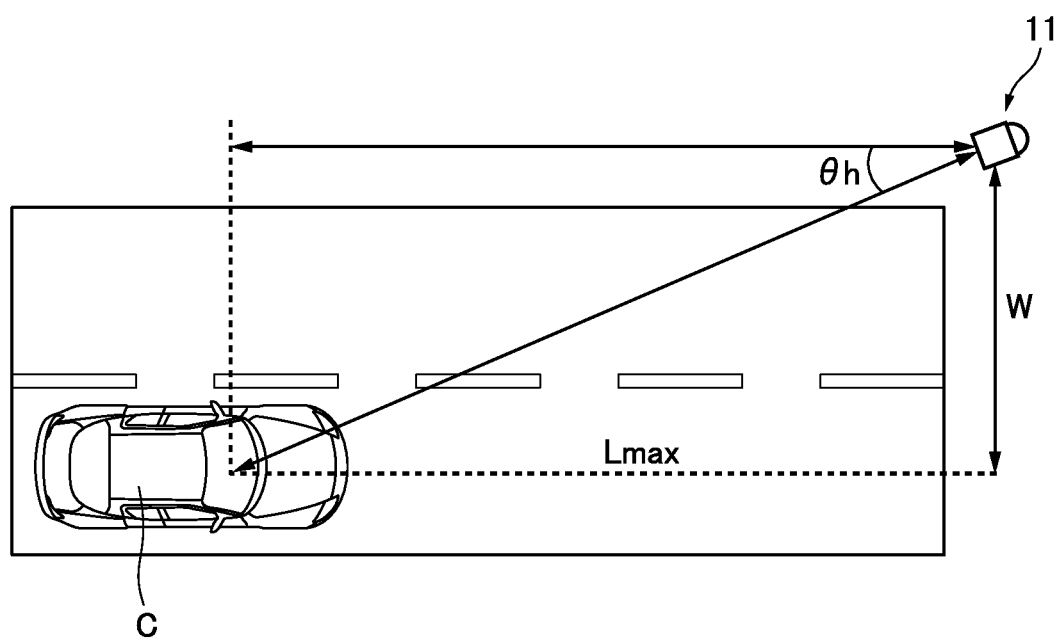
FIG. 5 is a schematic diagram showing an example installation horizontal angle.

FIG. 5 is a schematic diagram showing an example installation horizontal angle θh. Since the base portion 27 of the mount metal fitting 23 is can be rotated continuously in the range of the arc-shaped holes 35, the pan rotation angle (i.e., the installation horizontal angle θh in the horizontal plane) can be adjusted finely by changing the rotation position of the base portion 27 around the pan rotation axis 45 in the normal or reverse rotation direction. The installation horizontal angle θh is set with an assumption that the surveillance camera 11 is installed 0.5 m beside the road. The distance W from the surveillance camera 11 to the vehicle C in the road width direction is set in a range of 0 to 6 m. The maximum horizontal distance Lmax to the vehicle C is set at about 30 m. The installation horizontal angle θh is adjusted in, for example, a range of 0° to 13° in the horizontal plane. The above values are examples and it goes without saying that these parameters are not limited to those values.

Figure 6:
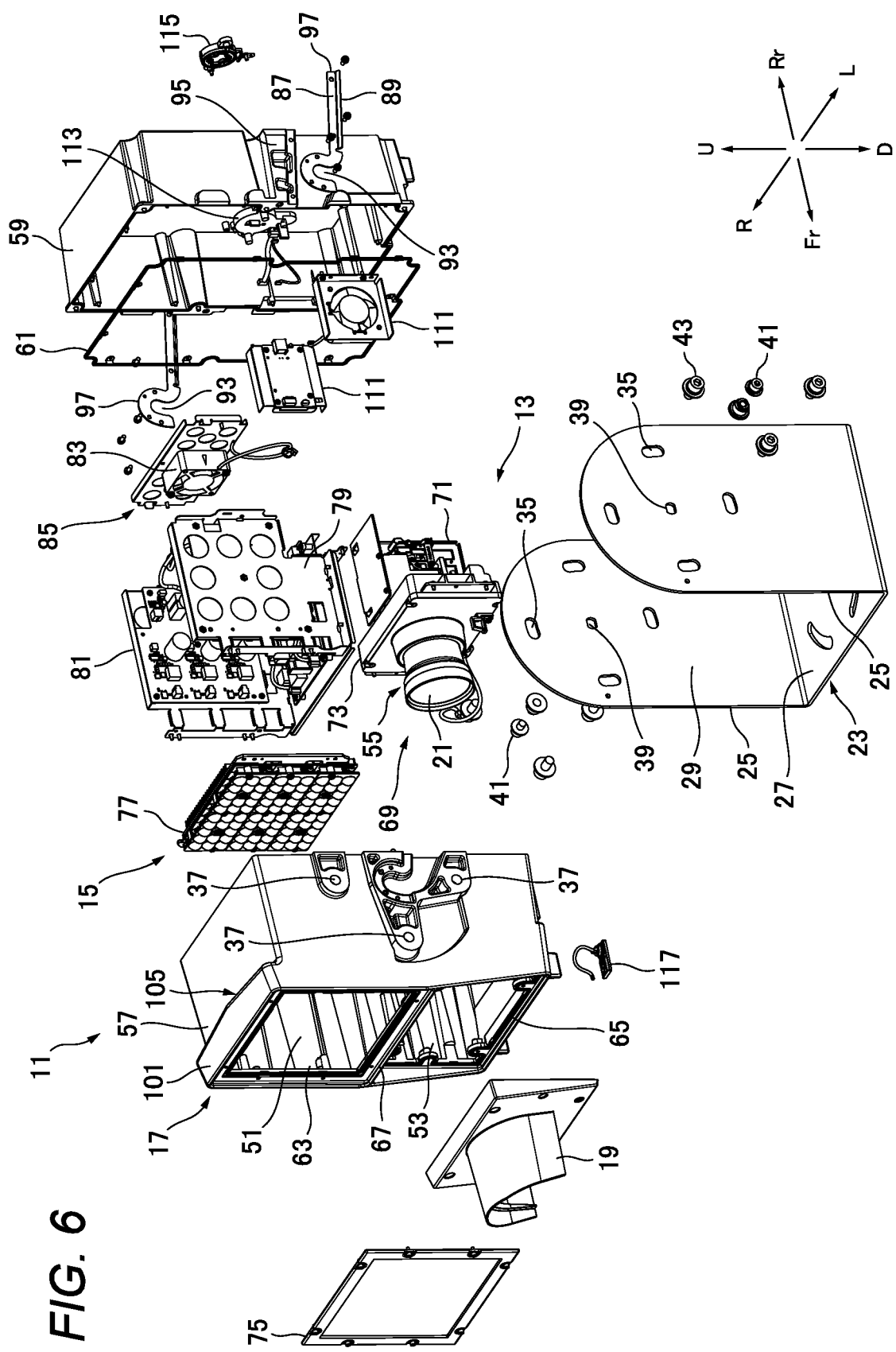
FIG. 6 is an exploded perspective view of the surveillance camera shown in FIG. 1.

FIG. 6 is an exploded perspective view of the surveillance camera 11 shown in FIG. 1. The main body 17 is shaped approximately like a cuboid that is long in the top-bottom direction. The main body 17 employed in the first embodiment is an assembly of two divisional parts separated in the front-rear direction, that is, a main body front portion 57 and a main body rear portion 59. The main body front portion 57 and the main body rear portion 59 are assembled together watertightly with a gasket 61 sandwiched between them. The main body front portion 57 is partitioned into an upper, illumination unit opening 63 and a lower, camera unit opening 65 by a horizontal rib 67.

The camera unit 13 is installed in the lower space 53 of the main body 17. The camera unit 13 has a camera 69 which is composed of a camera main body 71 having an imaging device (not shown), a lens unit 55, and a filter switching mechanism 73 provided between the lens unit 55 and the camera main body 71.

An IR (infrared ray) cutting filter (not shown) or a untreated glass (not shown) member is disposed in the filter switching mechanism 73 in a switchable manner. The filter switching mechanism 73 switches between the IR cutting filter and the untreated glass member and disposes the selected one of them on the optical axis of the lens unit 55.

The filter switching mechanism 73 disposes the IR cutting filter on the optical axis in a daytime mode that is established during the daytime, for example. As a result, in the daytime mode, RGB (red, green, blue) light obtained by cutting an IR component is received by the imaging device, whereby visible light that is high in image quality is obtained.

On the other hand, the filter switching mechanism 73 disposes the untreated glass member on the optical axis in a nighttime mode that is established during the nighttime, for example. As a result, in the nighttime mode, the imaging device receives incident light that has passed through the untreated glass member without being interrupted by the IR cutting filter and hence contains an IR component, whereby an IR image having a certain level of brightness is obtained.

The illumination unit 15 is installed in the upper space 51 of the main body 17. The illumination unit 15 applies illumination light to a subject to be imaged by the camera unit 13. The front opening of the illumination unit 15 is defined by an illumination front cover 75 which is shaped like a rectangular frame. The illumination front cover 75 fixes, to the main body 17, a circumferential portion of a light source plate 77 in which plural IR light sources are arranged on a rectangular mounting board in matrix form. The illumination unit 15 houses, among other things, a main board 79 having a processor, and a light source control board 81 having a control circuit for the filter switching mechanism 73 etc., behind the light source plate 77. An exhaust unit 85 incorporating a fan 83 is disposed behind the main board 79, the light source control board 81, etc.

The two side wall surfaces of the main body 17 are formed with respective step portions. The step portions are put on the pair of tilt shafts, respectively, whereby the main body 17 is supported by the mount metal fitting 23.

Each of the step portions employed in the first embodiment has a projection strip elevated surface 87 (see FIG. 14) and a projection strip bottom surface 89. The projection strip elevated surface 87 is elevated from the associated side wall surface and extends in the front-rear direction parallel with the side wall surface. The projection strip bottom surface 89 is a bottom surface of a projection strip 91 and projects approximately perpendicularly from the side wall surface. The projection strip 91 is an example of the step portion.

In the surveillance camera 11, the camera unit 13 is installed in the lower space 53 so as to occupy its front portion and the illumination unit 15 is installed in the upper space 51 so as to occupy its front portion. The projection strip 91 is formed so as to go down as the position goes rearward.

The projection strip 91 has a recess 93 approximately at the center of the main body 17 in the front-rear direction. The recess 93 is formed by recessing the projection strip bottom surface 89 upward. The recess 93 employed in the first embodiment is formed by curving the projection strip 91 so as to form an inverted-U shape. The associated tilt shaft is engaged with the recess 93 from below. In the first embodiment, the projection strip 91 is formed by threadedly engaging a projection strip reinforcement plate 97 made of, for example, sheet metal, with a projection strip stage 95 formed on the main body 17 using small screws. With this structure, necessary strength can be obtained when the projection strip 91 is supported by the tilt shaft even if the main body 17 is made of a resin.

Each projection strip 91 is formed with the recess 93 in the rear of the center of gravity 99 (see FIG. 2) of the main body 17 which houses such units as the camera unit 13 and the illumination unit 15. Thus, when the recesses 93 are supported by the respective tilt shafts, the main body 17 is supported by the mount metal fitting 23 so as to be inclined forward.

The surveillance camera 11 has grip portions 105, that is, a projection portion 101 which is a top-front portion extending between its two respective side surfaces and projecting upward and a finger insertion portion 103 (see FIG. 16) which is a bottom-front portion extending in the left-right direction and recessed upward. The grip portions 105 make it possible to hold the main body 17 stably by supporting it from below by inserting fingers of one hand into the finger insertion portion 103 and holding the projection portion 101 with the other hand.

Figure 7:
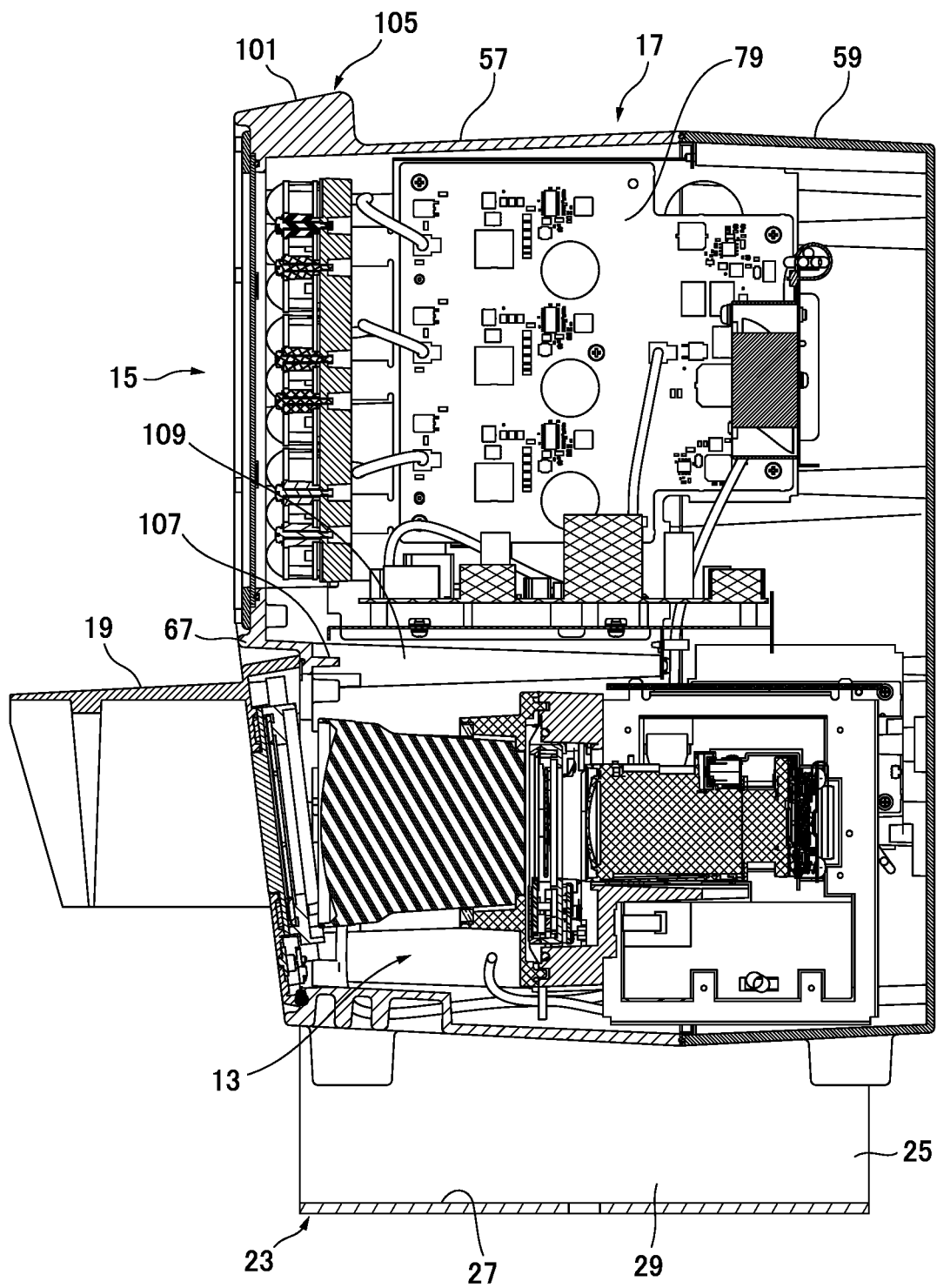
FIG. 7 is an A-A sectional view of FIG. 1.

FIG. 7 is an A-A sectional view of FIG. 1. A rib 67 has an engagement portion 107 on the side of the housing space. The above-mentioned main board 79, light source control board 81, etc. provided in the illumination unit 15 are supported by a partition plate 109. The partition plate 109 is supported by the main body front portion 57 because a front edge portion of the partition plate 109 is engaged with the engagement portion 107 of the rib 67. Two side edge portions of the partition plate 109 are supported by the main body 17 in such a manner as to be inserted in, for example, engagement grooves formed in the main body front portion 57 and the main body rear portion 59 so as to extend in the front-rear direction. The one housing space of the main body 17 is partitioned into the lower space 53 and the upper space 51 (see FIG. 6) by the partition plate 109, and the camera unit 13 and the illumination unit 15 are housed in the lower space 53 and the upper space 51, respectively.

As shown in FIG. 6, ventilation members 111 which communicate with the outside are attached to two respective bottom side portions of the main body rear portion 59. A ring-shaped fixing member 115 is fixed to a cable penetration hole 113 which is formed through the rear wall of the main body rear portion 59. A wire fixing metal fitting 117 is attached to the bottom surface of the main body front portion 57.

Figure 8:
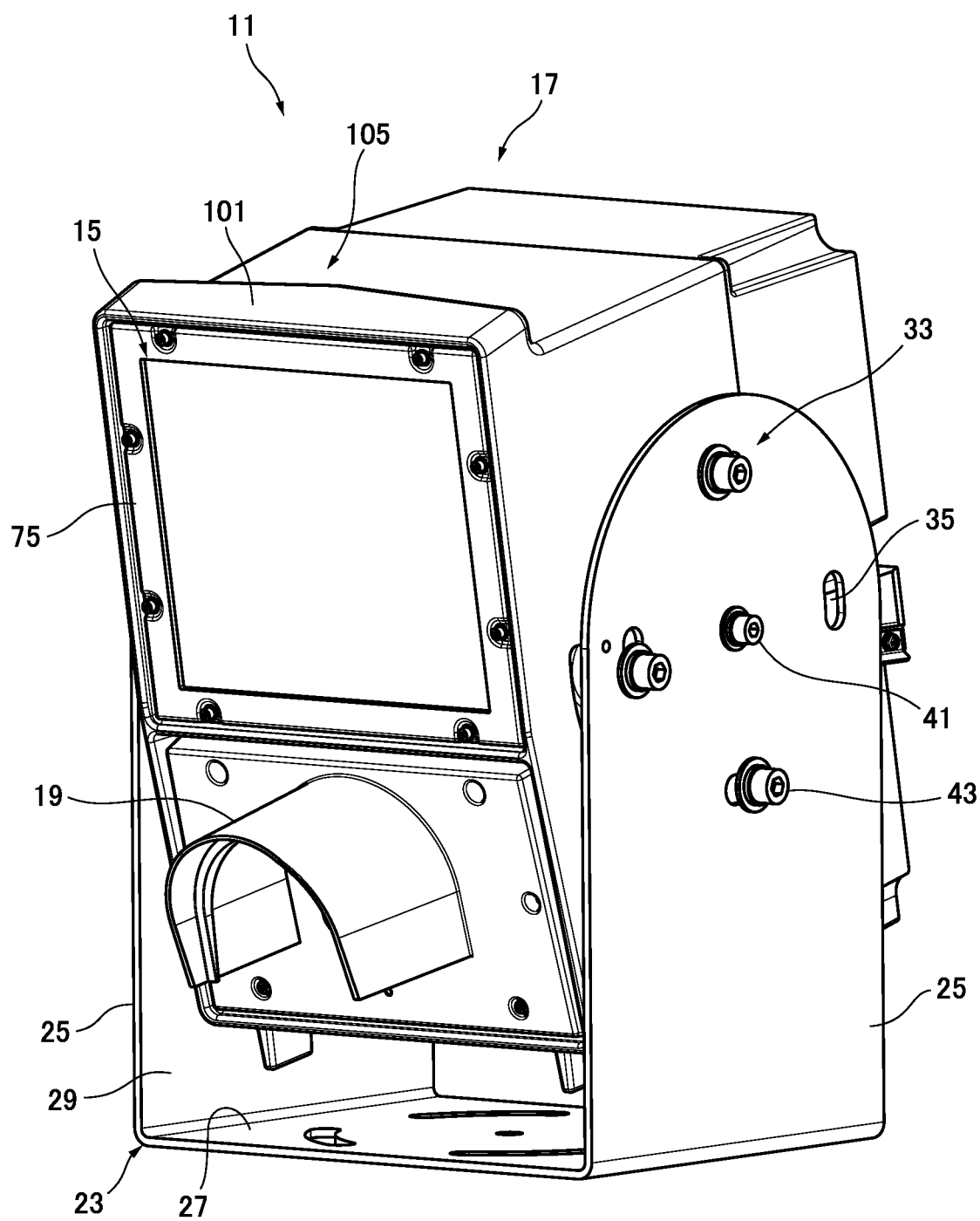
FIG. 8 is a perspective view of the surveillance camera being supported from below.

FIG. 8 is a perspective view of the surveillance camera 11 being supported from below. A fixing position of the base portion 27 of the mount metal fitting 23 is determined in such a manner that the pair of side plates 25 of the mount metal fitting 23 are fixed to central portions of the main body 17 by the tilt fixing portions 33, respectively. In the surveillance camera 11 shown in FIG. 8, the mount metal fitting 23 is fixed at such a position as to be opposed to the bottom surface of the base portion 27, whereby the base portion 27 can be used as a metal fitting for bottom-supported installation of the surveillance camera 11, that is, the surveillance camera 11 is bottom-supported via the base portion 27. The base portion 27 can be fixed to a platform having a simple shape. Thus, where, for example, a space exists between a gantry and a traffic sign, it is possible to mount and fix the platform on and to a horizontal rod member of the gantry and to fix the base portion 27 of the mount metal fitting 23 to the platform. For another example, it is possible to fix the platform to a rod member using a U-band metal fitting (i.e., bottom-supported installation is enabled).

Figure 10:
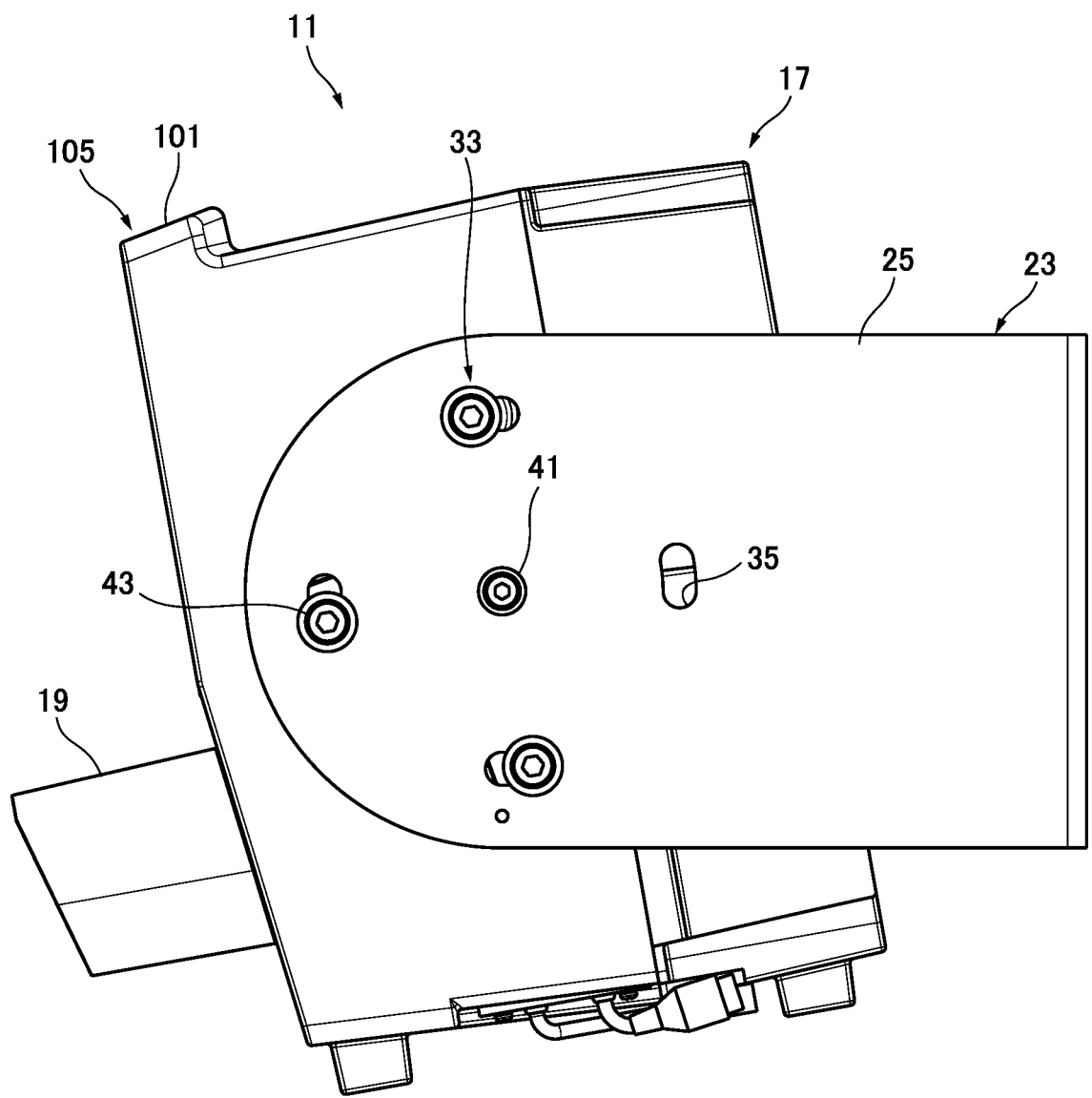
FIG. 10 is a side view of the surveillance camera shown in FIG. 9.

FIG. 9 is a perspective view of the surveillance camera 11 being supported from the back side. FIG. 10 is a side view of the surveillance camera 11 shown in FIG. 9.

Where the base portion 27 of the mount metal fitting 23 is fixed at such a position as to be opposed to the back surface of the surveillance camera 11, the base portion 27 serves as a fixing portion for back-supported installation and hence the surveillance camera 11 is fixed from the back side. Where a gantry has a vertical rod member or a vertical pole can be used, it is possible to fix a platform to the rod member or the vertical pole parallel with it and to fix the base portion 27 of the mount metal fitting 23 to the platform from the front side. The surveillance camera 11 is thus supported from the back side. In this case, the main body 17 is supported by the mount metal fitting 23 so as to be able to rotate continuously from the top to the bottom surface and hence the dip angle can be adjusted finely by changing the rotation position of the main body 17 in the normal or reverse rotation direction about the tilt rotation axes.

Figure 12:
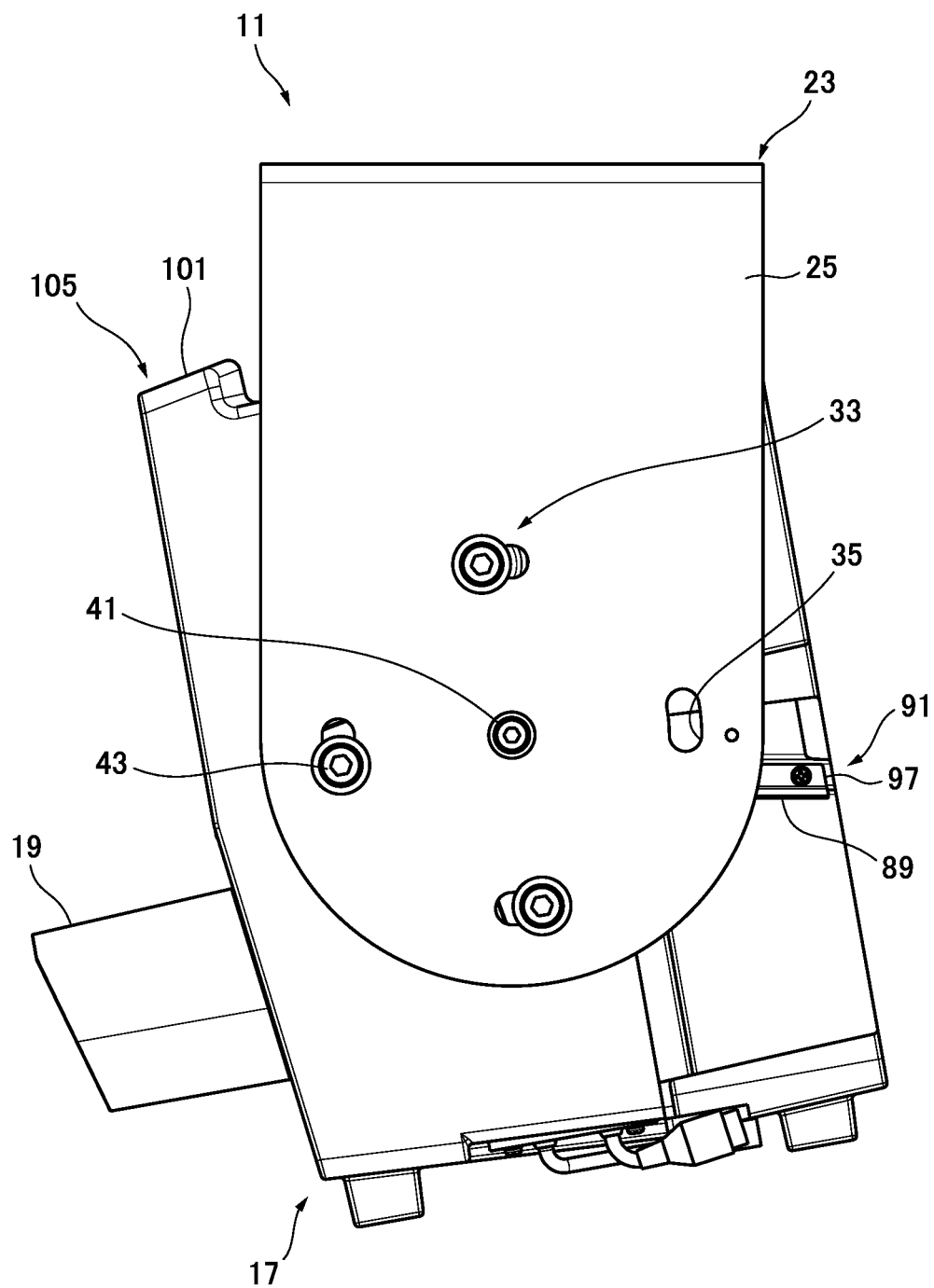
FIG. 12 is a side view of the surveillance camera shown in FIG. 11.

FIG. 11 is a perspective view of the surveillance camera 11 that is hanging-installed. FIG. 12 is a side view of the surveillance camera 11 shown in FIG. 11.

Where the base portion 27 is fixed at such a position as to be opposed to the top surface of the surveillance camera 11, the base portion 27 serves as a fixing portion for hanging installation and hence the surveillance camera 11 is fixed being hung. Where a gantry has a horizontal rod member to which a traffic sign is attached or even in the case where the gap between traffic signs is small, the base portion 27 of the mount metal fitting 23 can be fixed to the bottom surface of a platform by fixing the platform to the rod member from below. Hanging installation is thus possible. In this case, the main body 17 is supported so as to be able to rotate continuously from the top to the bottom surface and hence the dip angle can be adjusted finely in installing the surveillance camera 11 by changing the rotation position of the main body 17 in the normal or reverse rotation direction about the tilt rotation axes.

Next, an example procedure for installing the surveillance camera 11 will be outlined.

To install the surveillance camera 11, a date of closure of a road concerned is determined and arrangements are made for workers and an aerial lift truck. A package of the surveillance camera 11 is unpacked and the camera unit 13 is set. The road is closed before installation work. Red lamps, traffic cones, etc. are set on the road. Traffic control is done at the same time. A worker gets on the aerial lift truck bringing the surveillance camera 11. The worker fixes, using a U-band metal fitting, a platform to a rod member of a gantry on which the surveillance camera 11 is to be installed, and installs the surveillance camera 11 on the platform.

Figure 13:
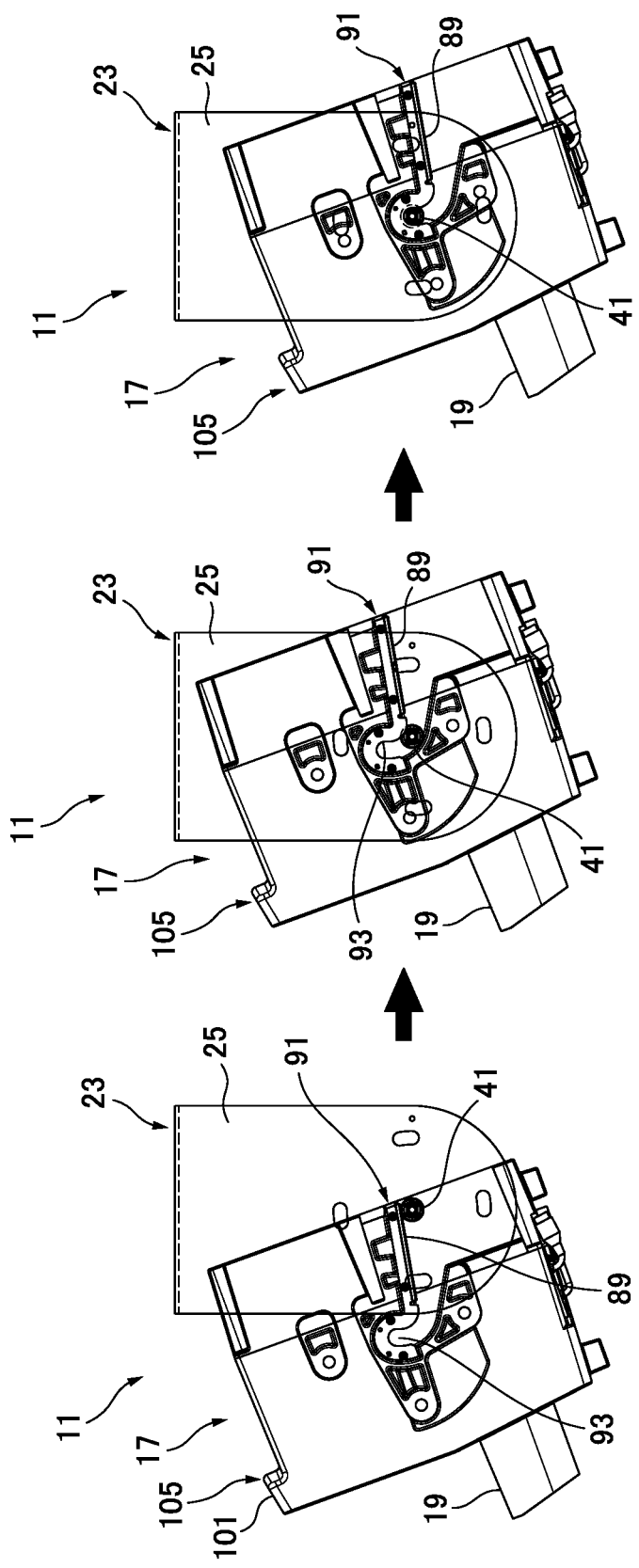
FIG. 13 illustrates a procedure for attaching a main body to a mount metal fitting in the case of hanging installation.

FIG. 13 is an operation diagram showing a procedure for attaching the main body 17 to the mount metal fitting 23 in the case of hanging installation. A manner of installation of the surveillance camera 11 will be outlined below roughly. First, the mount metal fitting 23 is fixed to the platform. Then the main body 17 is pushed into the holding space 29 of the mount metal fitting 23 thus fixed. In doing so, the projection strip bottom surfaces 89 are put on the respective tilt shafts. The recesses 93 of the projection strips 91 are dropped onto and fitted with the tilt shafts by pushing the main body 17 further into the holding space 29. Tentative support of the main body 17 by the mount metal fitting 23 is thus completed.

Figure 14:
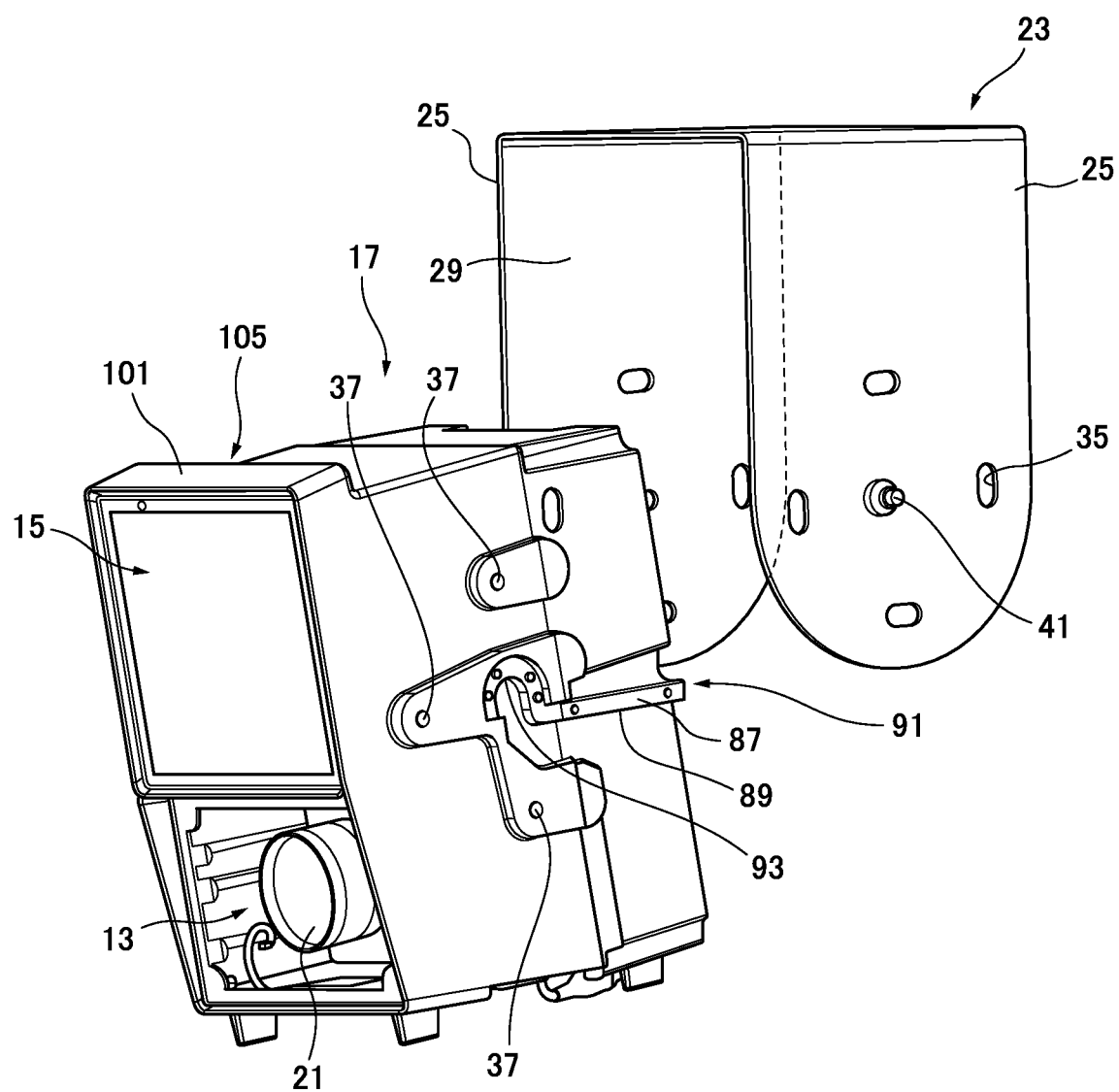
FIG. 14 shows a state before support of the main body by the mount metal fitting in the case of hanging installation.

FIG. 14 shows a state before support of the main body 17 by the mount metal fitting 23 in the case of hanging installation. Stated specifically, first, small screws that are inserted in the base portion 27 of the mount metal fitting 23 are fixed tentatively to the platform. Then the main body 17 is held by gripping the grip portion 105 of the main body 17 with both hands and the main body 17 is brought closer to the holding space 29 of the mount metal fitting 23. In FIG. 14, part of the front members of the surveillance camera 11, that is, the visor 19, the illumination front cover 75, etc., are omitted.

Figure 15:
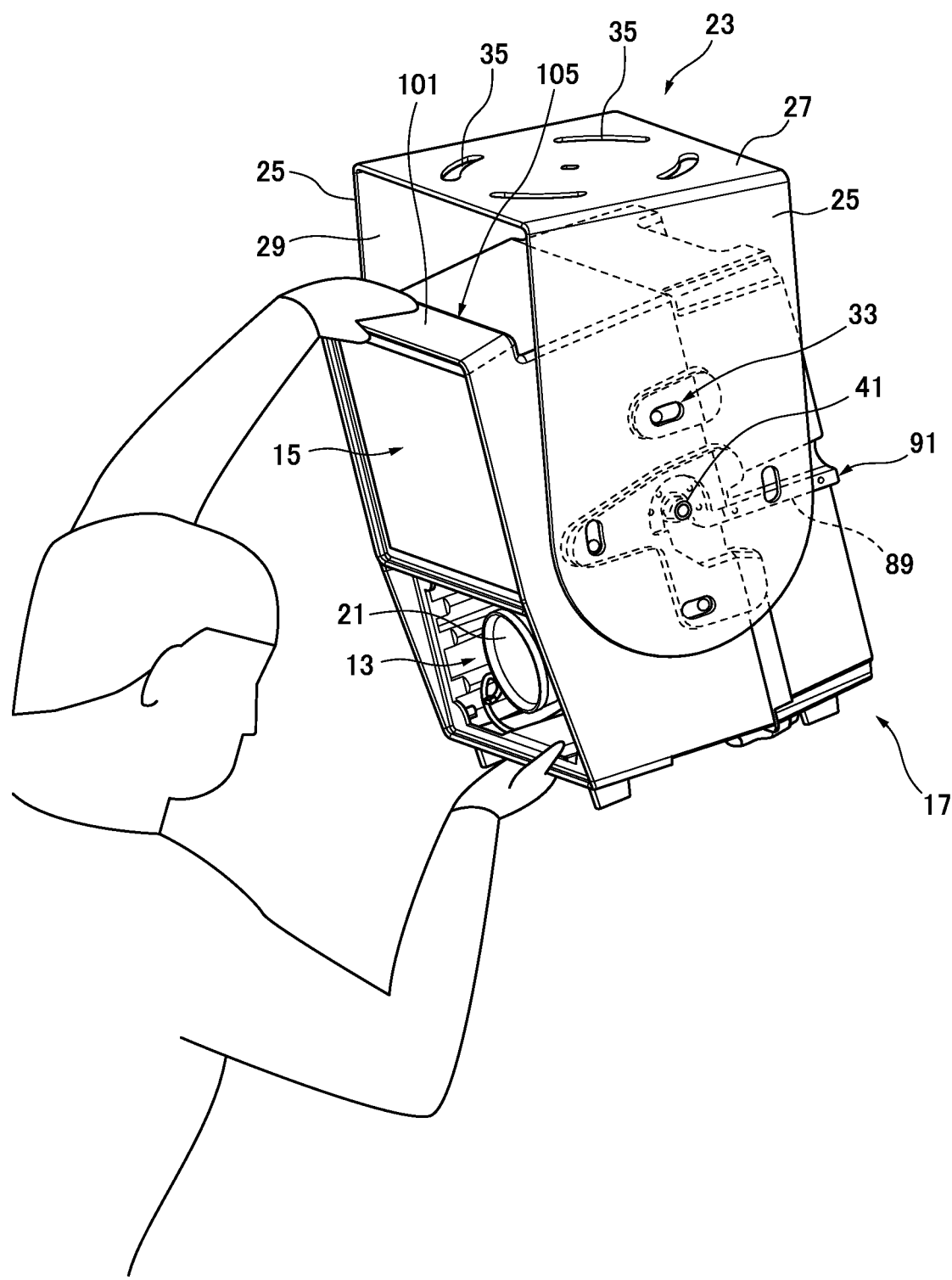
FIG. 15 shows a state that tilt shafts are supported by the mount metal fitting in the case of hanging installation.

FIG. 15 shows a state that the tilt shafts are supported by the mount metal fitting 23 in the case of hanging installation. In FIG. 15, part of the front members of the surveillance camera 11, that is, the visor 19, the illumination front cover 75, etc., are omitted.

Rear end portions of the projection strip bottom surfaces 89 of the surveillance camera 11 are put on the respective tilt shafts and the main body 17 is pushed rearward. More specifically, the main body 17 is pushed rearward until the recesses 93 of the projection strips 91 reach the tilt shafts. As soon as the recesses 93 of the projection strips 91 reach the tilt shafts, the recesses 93 fit with the tilt shafts main body 17 because of the self weight of the main body 17. As a result, the main body 17 is supported tentatively by the tilt shafts in a rotatable manner. The worker can thus release the main body 17 from both of his or her hands.

Then a safety wire is attached to the surveillance camera 11. A power line, a LAN cable, etc. (not shown) are connected to the surveillance camera 11. Other kinds of work are done thereafter; for example, USB cover is removed and Wi-Fi connection is made to a USB terminal.

An angle-of-view adjustment is then made. More specifically, tentative fixing is made of the pan fixing portion 47 after setting the installation horizontal angle roughly by swinging the base portion 27 about the pan rotation axis 45. The tilt fixing portions 33 are fixed tentatively after setting the installation dip angle roughly.

Figure 16:
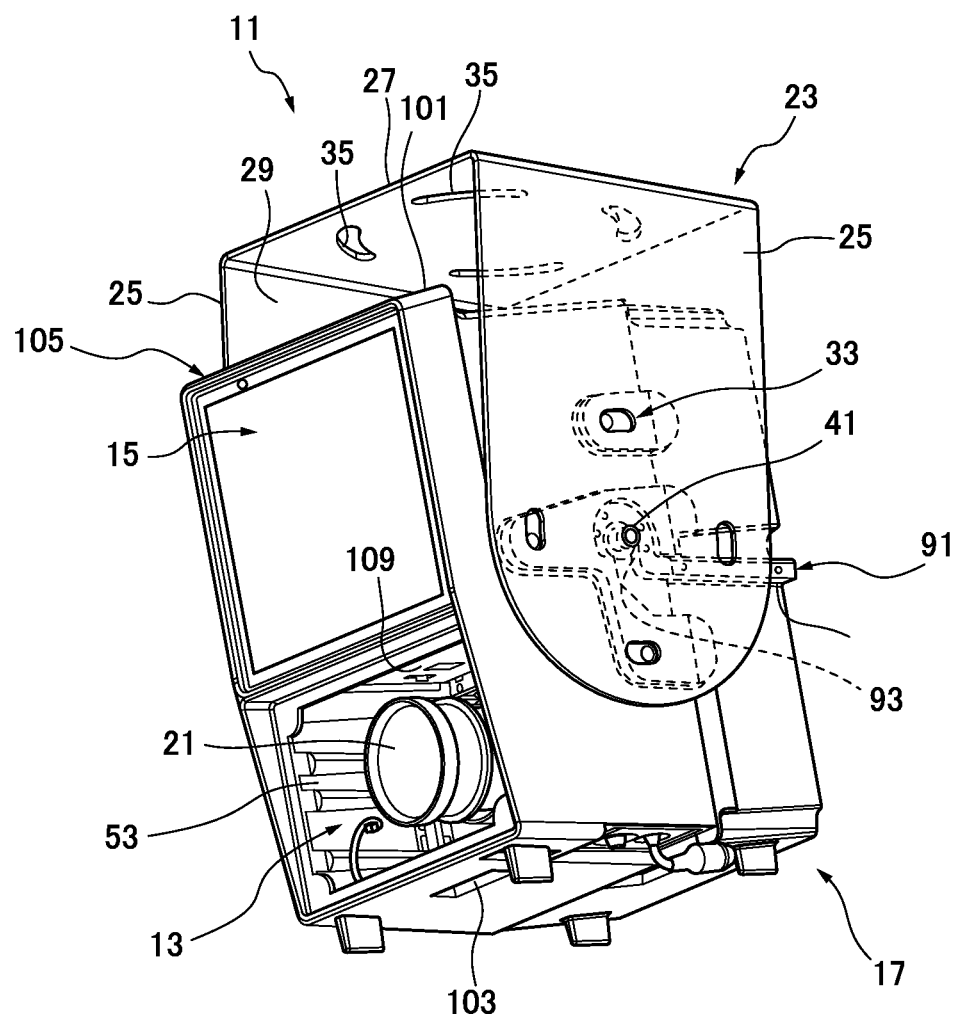
FIG. 16 is a perspective view showing the surveillance camera whose attachment of hanging installation has been completed.

FIG. 16 is a perspective view showing the surveillance camera 11 whose attachment of hanging installation has been completed. In FIG. 16, part of the front members of the surveillance camera 11, that is, the visor 19, the illumination front cover 75, etc., are omitted.

The attachment-completed surveillance camera 11 is then subjected to an angle-of-view adjustment. In the angle-of-view adjustment, first, an angle of view is checked on the wide-angle side using a personal computer or a portable terminal device (e.g., smartphone) and an instruction relating to an installation horizontal angle (in the pan direction) is issued. A pan adjustment is made on the basis of the instruction and the pan fixing portion 47 is fixed finally. Likewise, an instruction relating to an installation dip angle (in the tilt direction) is issued. A tilt adjustment is made on the basis of the instruction and the tilt fixing portions 33 are fixed finally. In doing so, a zooming adjustment is made at the same time and a detailed angle-of-view instruction is issued. After the installation dip angle adjustment and the installation horizontal angle adjustment have been completed and the final fixing has been made, the USB terminal is pulled out and the USB cover is attached to complete the installation work. Finally, the visor 19 (see FIG. 6) is attached to the main body 17 to finish the entire work.

Next, workings and advantages of the surveillance camera 11 having the above configuration will be described.

The surveillance camera 11 according to the first embodiment is equipped with the camera unit 13; the illumination unit 15 which applies illumination light to a subject to be imaged by the camera unit 13; and the main body 17 which is approximately shaped like a cuboid that is long in the top-bottom direction and has the internal housing space that is partitioned by the partition plate 109 into the lower space 53 that houses the camera unit 13 and the upper space 51 that houses the illumination unit 15.

In the surveillance camera 11 according to the first embodiment having the above configuration, the camera unit 13 and the illumination unit 15 are housed in the main body 17. The camera unit 13 has the imaging device and the lens unit 55. The lens unit 55 has the lens 21 which is made of a resin, for example. The illumination unit 15 has the light source plate 77 in which the plural IR light sources are arranged on the rectangular mounting board in matrix form, for example. The camera unit 13 and the illumination unit 15 are housed in the internal housing space of the main body 17 which is approximately shaped like a cuboid that is long in the top-bottom direction. The internal housing space of the main body 17 is partitioned into the lower space 53 and the upper space 51 by the partition plate 109 which is formed horizontally approximately at the center in the top-bottom direction. That is, the camera unit 13 and the illumination unit 15 are housed in the lower space 53 and the upper space 51, respectively, which are defined individually by the partition wall 109 which partitions the internal space of the single main body 17 in the top-bottom direction.

In the surveillance camera 11, since the camera unit 13 and the illumination unit 15 are housed by partitioning the housing space of the single main body 17 by the partition plate 109, the outer housing of the main body 17 is composed of a smaller number of components so as to have a simpler structure and is made lighter by dispensing with members for connecting constituent bodies etc. than in a case that the camera unit 13 and the illumination unit 15 are covered with different bodies.

Furthermore, in the main body 17, since only the single illumination unit 15 is housed in the upper space 51, the number of illumination units 15 can be halved compared with a conventional structure in which an upper illumination unit and a lower illumination unit are installed over and under a camera unit, respectively. Thus, the main body 17 can be reduced in weight.

As a result, the surveillance camera 11 can be made smaller in overall weight and can be installed more easily than surveillance cameras having conventional structures.

In the surveillance camera 11, since the partition plate 109 exists between the illumination unit 15 and the camera unit 13, a problem that light that leaks from the illumination unit 15 is diffuse-reflected inside the housing space and enters the camera unit 13 as stray light can be prevented, whereby corresponding reduction in imaging quality can be prevented.

The camera unit 13 which is housed in the lower space 53 has the lens 21 which is made of a resin. On the other hand, the illumination unit 15 which is housed in the upper space 51 has the plural IR light sources and hence is a heating body. In the main body 17, heat generated by driving of the illumination unit 15 moves upward by natural convection and does not tend to flow toward the camera unit 13 which is housed in the lower space 53. Furthermore, the lower space 53 and the upper space 51 are separated by the partition plate 109. Thus, in the main body 17, warmed air is not prone to enter the lower space 53 and radiated heat is interrupted by the partition plate 109. As a result, in the main body 17, influence of heat on the lens 21 made of a resin and reduction of imaging quality due to thermal deformation of the lens 21 can be suppressed.

The surveillance camera 11 according to the first embodiment is equipped with the mount metal fitting 23 which is approximately U-shaped in such a manner that one end portions of the parallel pair of side plates 25 are connected to each other by the base portion 27 and which has the tilt shafts projecting from the confronting surfaces of the side plates 25, respectively. And two side wall surfaces of the main body 17 is formed with the step portions which are formed on the two respective side wall surfaces of the main body 17 and are put on the pair of tilt shafts, respectively, to have the main body 17 supported by the mount metal fitting 23.

In this surveillance camera 11, the main body 17 is supported so as to be capable of tilting rotation relative to the base portion 27. The mount metal fitting 23 is supported relative to a plate-like platform that is attached to a rod member such as a gantry about the pan rotation axis 45 which is perpendicular to the base portion 27. The mount metal fitting 23 is approximately U-shaped in such a manner that the one end portions of the parallel pair of side plates 25 are connected to each other by the base portion 27. The mount metal fitting 23 has the tilt shafts that project from the confronting surfaces of the pair of side plates 25, respectively. That is, the tilt shafts project toward the holding space 29 formed between the pair of side plates 25. The mount metal fitting 23 supports the main body 17 in the holding space 29 formed between the pair of side plates 25.

The two side wall surfaces of the main body 17 has the step portions. The step portions are put on the pair of tilt shafts, respectively, whereby the main body 17 is supported by the mount metal fitting 23. The step portions have the respective surfaces that project from the side wall surfaces approximately perpendicularly and that face at least the bottom side. The surfaces facing the bottom side of the step portions are put on the respective tilt shafts. Examples of those step portions are the rail-shaped projection strips 91 projecting from the respective side wall surfaces, one-step step portions (the upper half and the lower half of each side wall surface are an upper step and a bottom step, respectively), and recess-shaped grooves.

In the surveillance camera 11 according to the first embodiment having the above structure, since the step portions are put on the respective tilt shafts when it is installed, a time during which a worker lifts up the surveillance camera 11 in doing installation work can be shortened and hence the installation work can be facilitated.

In the surveillance camera 11 according to the first embodiment, each step portion has the projection strip elevated surface 87, being parallel with the associated side wall surface, of the projection strip 91 projecting from the side wall surface and extending in the front-rear direction and the projection strip bottom surface 89 which projects from the side wall surface of the projection strip 91 approximately perpendicularly and faces the bottom side.

In this surveillance camera 11, each step portion is formed by the projection strip 91 which is elevated from the associated side wall surface and extends in the front-rear direction. The projection strip 91 has the projection strip elevated surface 87 and the projection strip bottom surface 89. The projection strip elevated surface 87 is elevated from the side wall surface of the main body 17 and extends parallel with it. The projection strip bottom surface 89 of the projection strip 91 projects from the side wall surface approximately perpendicularly and faces the bottom side. The top surface, located on the opposite side of the projection strip elevated surface 87 to the projection strip bottom surface 89, of the projection strip 91 is a projection strip top surface. The projection strip top surface projects approximately perpendicularly from the side wall surface of the projection strip 91 and faces the top side. That is, the projection strip 91 is rectangular in a cross section taken perpendicularly to its extension direction. The sectional shape of the projection strip 91 is not limited to a rectangle as long as it has at least the projection strip bottom surface 89 to be put on the tilt shaft.

In the surveillance camera 11 according to the first embodiment, when the main body 17 is supported by the mount metal fitting 23, the main body 17 is inserted in the horizontal direction into the holding space between the pair of side plates 25 of the mount metal fitting 23 that is fixed to a gantry or the like. In doing so, the projection strip bottom surfaces 89 of the projection strips 91 projecting from the side wall surfaces of the main body 17 are put on the respective tilt shafts. As a result, the main body 17 of the surveillance camera 11 is supported by the left and right tilt shafts of the mount metal fitting 23 via the left and right projection strips 91.

In the surveillance camera 11 according to the first embodiment, the camera unit 13 is installed in the lower space 53 so as to occupy its front portion and the illumination unit 15 is installed in the upper space 51 so as to occupy its front portion. The projection strip 91 is formed so as to go down as the position goes rearward.

In the surveillance camera 11, the camera unit 13 and the illumination unit 15 are installed in the lower space 53 and the upper space 51 so as to occupy their front portions, respectively. Since the camera unit 13 and the illumination unit 15 are installed in the main body 17 which is approximately shaped like a cuboid that is long in the top-bottom direction so as to be deviated forward, the front portion of the main body 17 is heavier than its rear portion. The main body 17 whose front portion is heavier can be held easily so as to be inclined forward. In many cases, the surveillance camera 11 is attached to a gantry or the like located at a high place using an aerial lift truck. In this case, a worker attaches the main body 17 to the mount metal fitting 23 in such a manner as to face the main body 17 squarely or facing obliquely upward. The worker can hold the surveillance camera 11 stably by supporting the bottom surface of the main body 17 with one hand and holding its top surface with the other hand. In particular, when the worker works while facing the main body 17 facing obliquely upward, since the projection strips 91 are formed so as to go down as the position goes rearward, no load occurs that causes the main body 17 to slide toward the worker. Thus, the worker need not stop the main body 17 coming to himself or herself and hence can perform the pushing work approximately in the horizontal direction. As a result, work of positioning the surveillance camera 11 can be carried out more easily than in a case that the rear portion of the main body 17 is heavier than its front portion.

In the surveillance camera 11 according to the first embodiment, each projection strip 91 has the recess 93 to be engaged with the associated tilt shaft approximately, the recess 93 being formed by recessing the projection strip bottom surface 89 upward approximately at the center of the main body 17 in the front-rear direction.

In this surveillance camera 11, each projection strip 91 has the recess 93 in the projection strip bottom surface 89 which is recessed upward. In doing work of pushing obliquely upward while stopping the main body 17, first the worker puts rear portions of the projection strip bottom surfaces 89 that project from the left and right side wall surfaces of the main body 17 on the respective tilt shafts of the mount metal fitting 23. In this state, most of the weight of the main body 17 is supported by the tilt shafts. Thus, the worker need not receive a weight that would otherwise occur if the main body 17 slid toward the worker and hence can carry out the pushing work easily. As the worker pushes the main body 17 into the holding space 29 of the mount metal fitting 23, the projection strip bottom surfaces 89 slide rearward with respect to the tilt shafts and the recesses 93 of the projection strip bottom surfaces 89 reach the tilt shafts finally. As soon as the recesses 93 reach the tilt shafts, the recesses are fitted with the tilt shafts because of the weight of the main body 17 and sliding of the projection strips 91 with respect to the tilt shafts is prevented. The sliding-prevented main body 17 is supported tentatively by (put tentatively on) the tilt shafts rotatably with such a posture that it is inclined forward as a result of rotation about the tilt shafts. The worker can release the main body 17 from both of his or her hands in the tentative support state that the recesses are fitted with the tilt shafts. Furthermore, in the tentative support state, the worker can adjust the installation angle of the surveillance camera 11 by both hands from which the main body 17 has been released.

In the surveillance camera 11 according to the first embodiment, the recesses 93 are located in the rear of the center of gravity 99 of the main body 17 that houses the camera unit 13 and the illumination unit 15.

In the surveillance camera 11, the recesses 93 formed in the respective projection strips 91 are located in the rear of the center of gravity 99 of the main body 17. In other words, the center of gravity 99 of the main body 17 is located in front of the recesses 93 via which the main body 17 is supported by the tilt shafts. As a result, moment occurs around the tilt shafts, whereby the main body 17 is balanced in a forward-inclined posture and supported tentatively. Since the main body 17 is rendered in this state, in particular, a worker can easily carry out, at a high place, work of pushing the main body 17 obliquely upward into the housing space 29 of the mount metal fitting 23.

In the surveillance camera 11 according to the first embodiment, the main body 17 has the grip portions 105, that is, the projection portion 101, at a top-front portion, extending between its two respective side surfaces and projecting upward and the finger insertion portion 103, at a bottom-front portion, extending in the left-right direction and recessed upward.

In this surveillance camera 11, the main body 17 is formed with the grip portions 105. One of the grip portions 105 is the projection portion 101I, at a top-front portion, extending between its two respective side surfaces and projecting upward and the other is the finger insertion portion 103, at a bottom-front portion, extending in the left-right direction and recessed upward. Thus, a worker can support, from below, the main body 17 by gripping the projection portion 101 of the grip portions 105 with one hand while holding the finger insertion portion 103 of the grip portions 105 with the other hand. This allows the worker to hold the forward-inclined main body 17 stably in such a manner that the center of gravity 99 of the main body 17 is located at the middle between his or her hands while preventing the main body 17 from slipping down from the hands.

In the surveillance camera 11 according to the first embodiment, the main body 17 is equipped with the visor 19 which projects forward from the front surface of the main body 17 and is a cylinder open at the bottom so as to cover, from above, part of the outer circumferential surface of the lens 21 of the camera unit 13.

In this surveillance camera 11, the visor 19 covers part of the outer circumferential surface of the lens 21 and hence can prevent raindrops from falling in front of the lens 21. Raindrops do not go into the range of the angle of view and a better field of view can be obtained during a rainfall. The inner surface of the visor 19 may be painted black. This prevents events that part of illumination light is reflected by the inner surface of the visor 19 and enters the lens 21 and that light that is emitted from headlights and reflected by a road surface enters the lens 21 in nighttime imaging, whereby lowering of the rate of recognition of images taken by the surveillance camera 11 can be suppressed. With the feature that the visor 19 is shaped like a pipe that is open at the bottom, it is difficult for birds having an attribute of nest building in a pipe to build a next in the visor 19.

In the surveillance camera 11 according to the first embodiment, the base portion 27 of the mount metal fitting 23 can be set so as to confront the bottom surface to the top surface of the main body 17 by rotating the mount metal fitting 23 about the tilt shafts. And the tilt fixing portions 33 for fixing the angle of rotation of the main body 17 about the tilt shafts are provided so as to bridge the main body 17 and the side plates 25.

In this surveillance camera 11, the two side surfaces of the main body 17 are supported by the parallel pair of side plates 25 of the mount metal fitting 23. The main body 17 is supported rotatably by the side plates 25 of the mount metal fitting 23 about the tilt rotation axes 31 which are perpendicular to the side surfaces of the main body 17. The bottom ends of the pair of side plates 25 are connected by the base portion 27.

The mount metal fitting 23 is rotated so that its base portion 27 can confront the bottom surface to the top surface of the main body 17. The tilt rotation axes 31 are located approximately at the centers, in the top-bottom direction, of the side surfaces of the main body 17 so as to minimize the gap between the bottom surface and the base portion 27 and the gap between the top surface and the base portion 27. The side plates 25 of the mount metal fitting 23 can be fixed to the main body 17 by the tilt fixing portions 33. Thus, the surveillance camera 11 according to the first embodiment can be installed in a bottom-supported manner by fixing the mount metal fitting 23 to the main body 17 with the base portion 27 located under the main body 17, can be installed in a back-supported manner by fixing the mount metal fitting 23 to the main body 17 with the base portion 27 located behind the main body 17, and can be installed in a hung posture by fixing the mount metal fitting 23 to the main body 17 with the base portion 27 located over the main body 17. As such, the surveillance camera 11 can be installed in a wider variety of manners than the conventional vehicle imaging apparatus capable of only bottom-supported installation using leg portions.

In the surveillance camera 11, since the adjustable mount metal fitting 23 that enables bottom-supported installation, back-supported installation, and hanging installation is attached to the main body 17 in advance, it is not necessary to select and purchase, separately, dedicated attachment metal fittings having an adjustment mechanism. In addition, even when the surveillance camera 11 is installed at a site that requires closing of a road, the angle of view etc. can be adjusted in a short time by simple installation work of fastening the mount metal fitting 23 using the fixing portions. As such, the surveillance camera 11 according to the first embodiment can suppress reduction of the rate of recognition and can be installed easily with a high degree of freedom of installation for each installation environment.

Embodiment 2

A second embodiment is directed to surveillance camera capable of suppressing imaging quality reduction.

Figure 17:
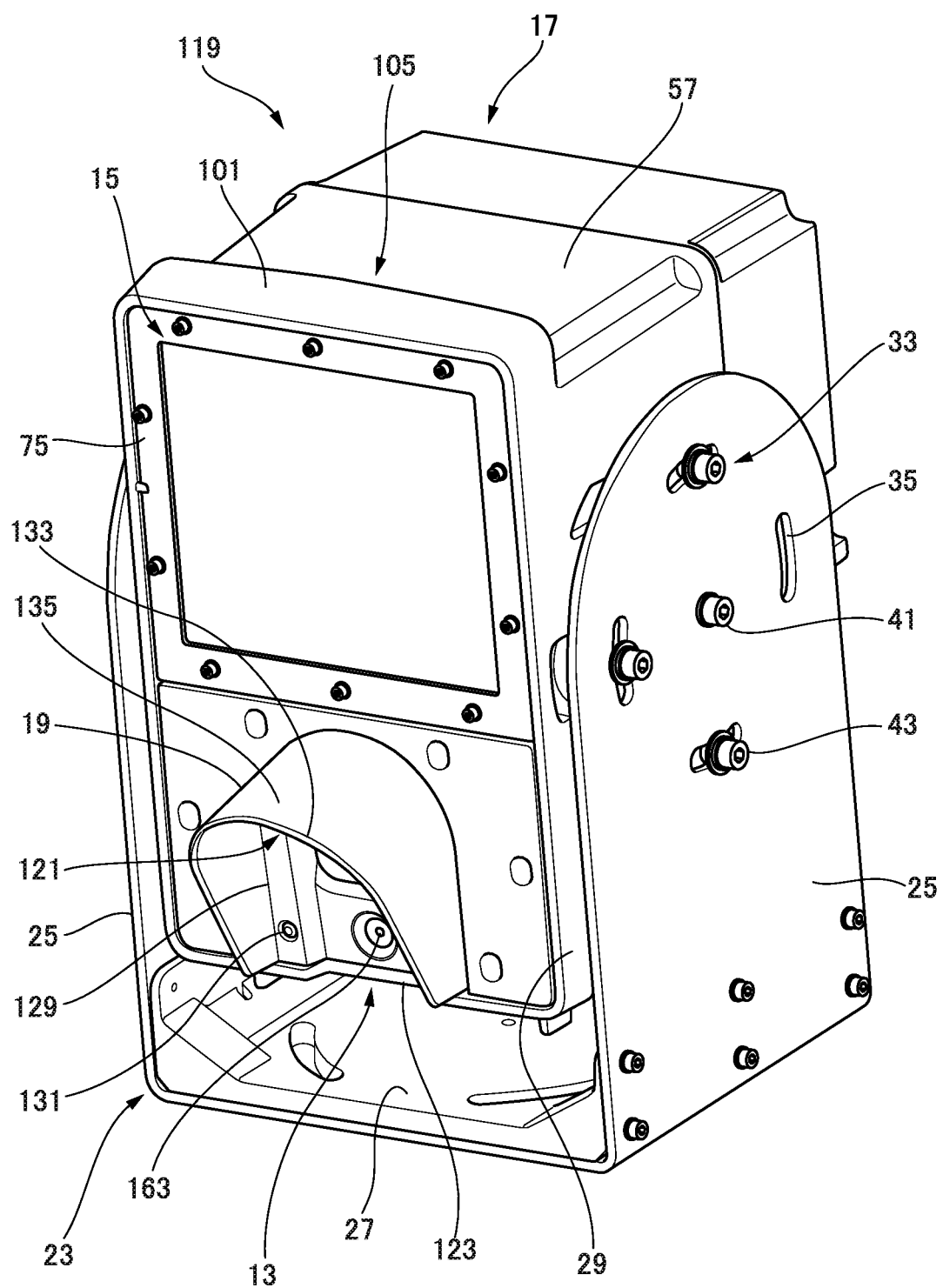
FIG. 17 is a perspective view of a surveillance camera according to a second embodiment.

FIG. 17 is a perspective view of the surveillance camera 119 according to the second embodiment. In the second embodiment, members and portions having the same ones in FIGS. 1-16 will be given the same reference symbols and will not be described redundantly. The surveillance camera 119 according to the second embodiment is equipped with, as major constituent elements, the camera unit 13, the illumination unit 15, a visor 19, a water repelling portion 121, and a cut 123.

Figure 18:
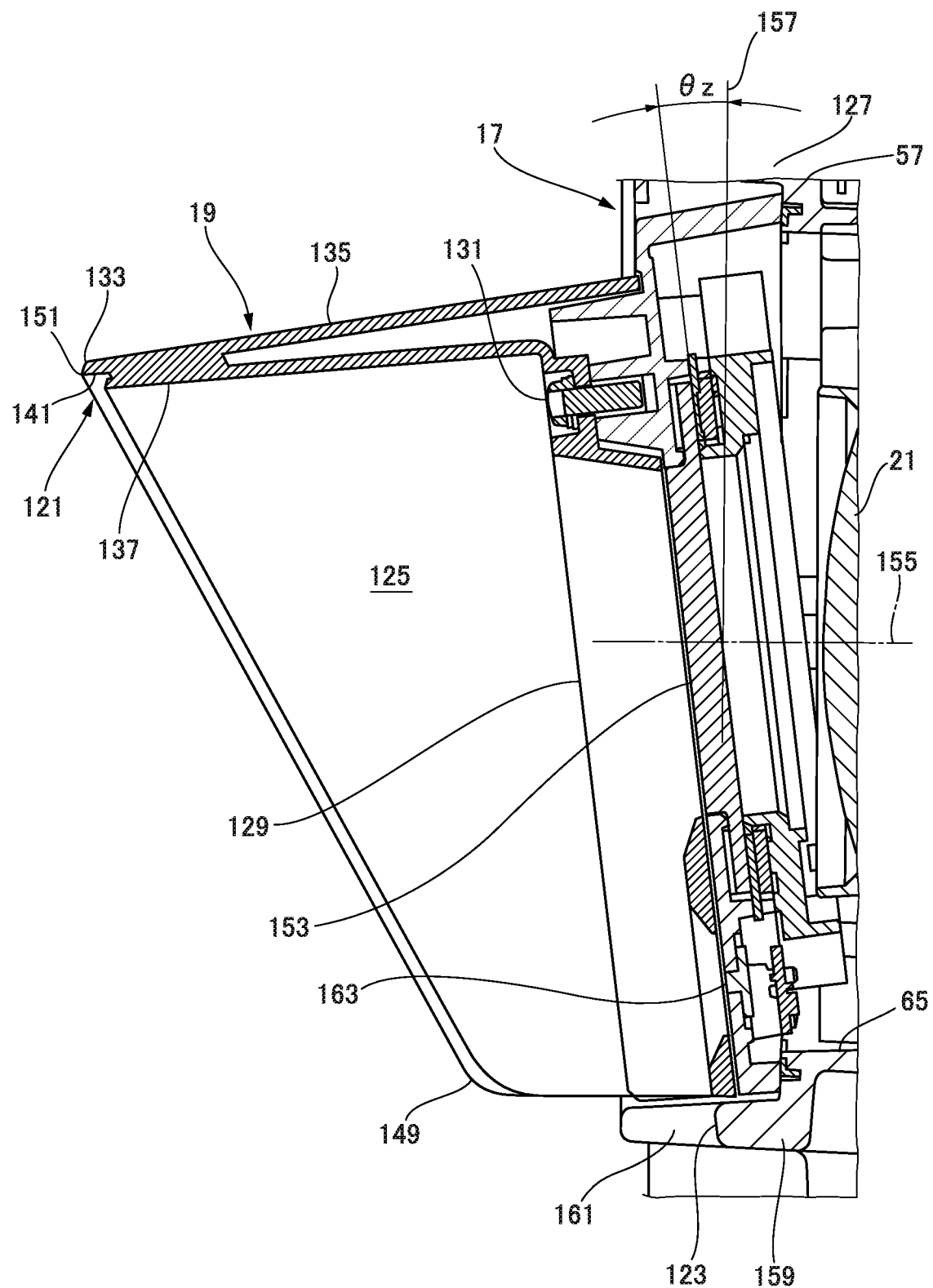
FIG. 18 is a vertical sectional view of a visor shown in FIG. 17.

FIG. 18 is a vertical sectional view of the visor 19 shown in FIG. 17. The visor 19 extends from the front surface of the main body 17 so as to be inclined forward. The visor 19 covers a light receiving space 125 in front of the camera unit 13 from above. A visor fixing frame 127 is attached to the main body front portion 57 of the main body 17. Frame attachment portions 129 of the visor 19 are fixed to the visor fixing frame 127 by visor fixing screws 131.

A tip portion 133 of the visor 19 is formed with the water repelling portion 121. The water repelling portion 121 is formed in step form in such a manner that the tip of an inner circumferential surface 137 of the visor 19 recedes from the tip of an outer circumferential surface 135 of the visor 19 in the direction opposite to projection of the visor 19.

Figure 19:
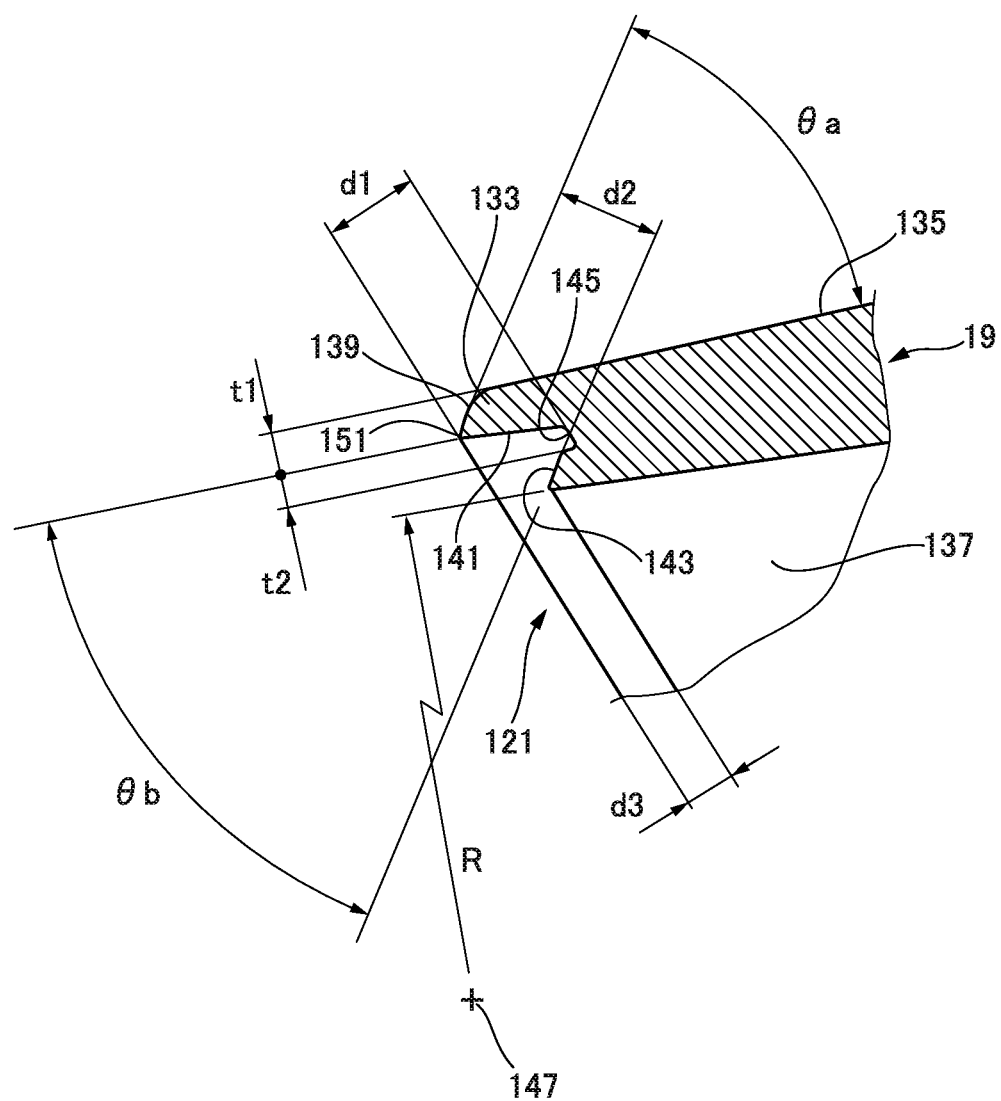
FIG. 19 is an enlarged view of an essential part of a tip portion of the visor shown in FIG. 18.

FIG. 19 is an enlarged view of an essential part of the tip portion 133 of the visor 19 shown in FIG. 18. The water repelling portion 121 has a first tip surface 139 which is connected to the outer circumferential surface 135. The first tip surface 139 is inclined so that it goes down as the position goes forward and its extension line forms an acute angle θa (e.g., about 55°) with the outer circumferential surface 135. A tip bottom surface 141 which extends rearward is connected to the first tip surface 139. The thickness t1 of the portion defined by the outer circumferential surface 135 and the tip bottom surface 141 is set at about 2 mm. A second tip surface 143 is connected to the inner circumferential surface 137. The tip bottom surface 141 and the second tip surface 143 form an acute angle θb.

An inside groove 145 is formed between the tip bottom surface 141 and the second tip surface 143. The width t2 of the inside groove 145 is set at about 0.5 to 3 mm, for example. The dimension d1 between the bottom surface of the inside groove 145 and the tip of the first tip surface 139 is set at about 4 mm, for example. The first tip surface 139 and the second tip surface 143 are approximately parallel with each other. The interval d2 between the first tip surface 139 and the second tip surface 143 is set at about 4 mm, for example. And the distance d3 between the tip of the first tip surface 139 and the tip of the second tip surface 143 is set at about 2 mm, for example. A top portion of the inverted-U-shaped visor 19 assumes part of a circle (the center is denoted by 147) whose radius R of curvature is equal to about 50 mm, for example.

Figure 20:
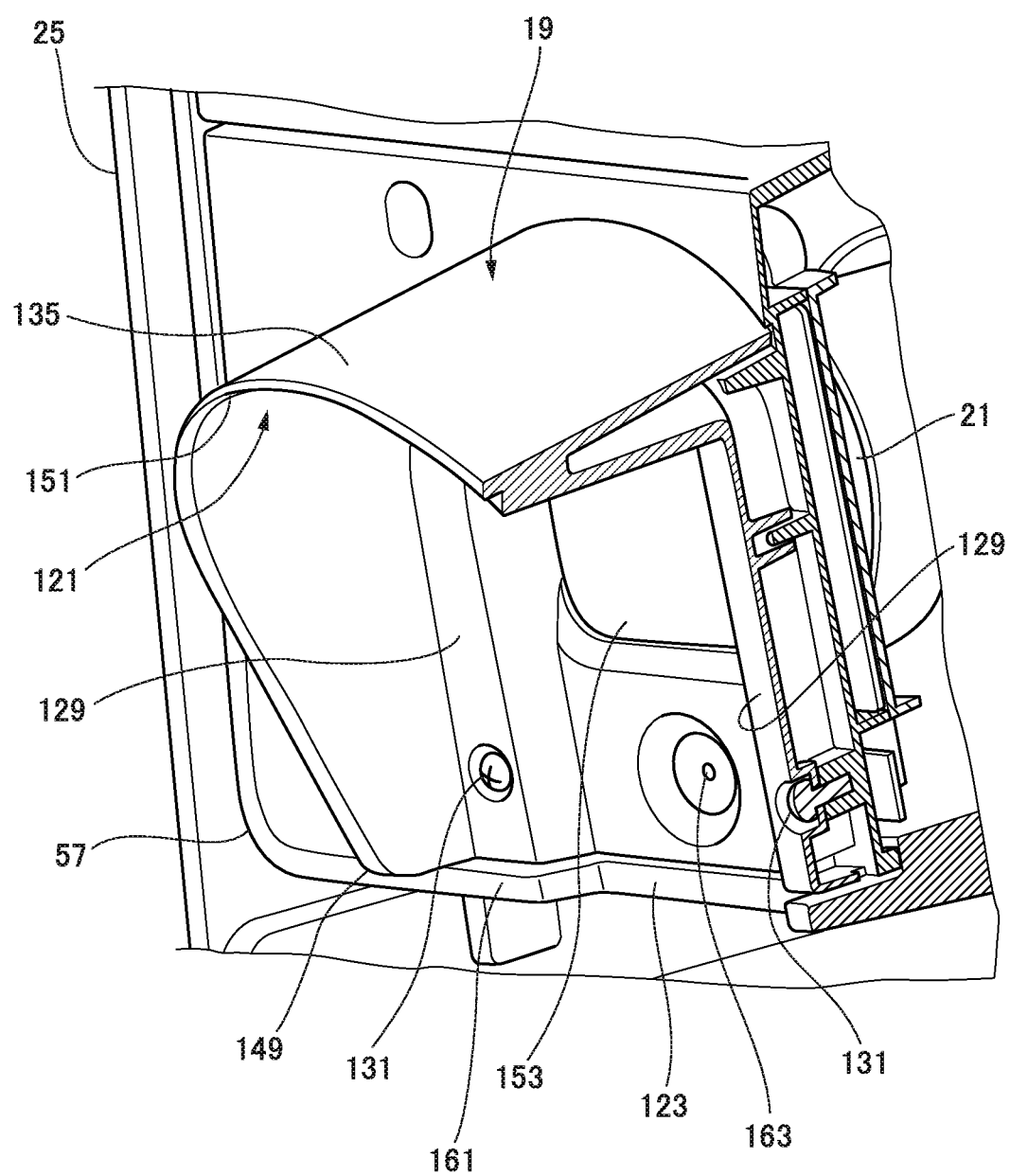
FIG. 20 is an enlarged perspective view of an essential part of the visor.

FIG. 20 is an enlarged view of an essential part of the visor 19. The visor 19 is shaped like an inverted-U-shaped gutter that is open at the bottom.

The visor 19 is formed in such a manner that bottom tip portions 149 recede from a top tip portion 151 in its extension direction.

As shown in FIG. 18, a glass plate 153 for covering the lens 21 is provided deep inside the visor 19. The glass plate 153 is disposed so as to be inclined forward and form a prescribed angle θz with a virtual line 157 that is perpendicular to the optical axis 155 of the lens 21.

In the surveillance camera 119, the camera unit opening 65 where a bottom plate portion 159 is provided is formed in the main body front portion 57 of the main body 17. A bottom plate tip portion 161, exposed as a result of the retreat of a bottom portion of the glass plate 153 because of its inclination, of the bottom plate portion 159 is formed with a cut 123 right under an illuminance sensor 163 provided under the glass plate 153.

Next, workings and advantages of the surveillance camera 119 having the above configuration will be described.

The surveillance camera 119 according to the second embodiment is equipped with the camera unit 13; the illumination unit 15 which applies illumination light to a subject to be imaged by the camera unit 13; the main body 17 which is approximately shaped like a cuboid that is long in the top-bottom direction and has the internal housing space that is partitioned by the partition plate 109 into the lower space 53 that houses the camera unit 13 and an upper space 51 that houses the illumination unit 15; the visor 19 which projects from the front surface of the main body 17 so as to be inclined forward and covers, from above, the light-receiving space 125 formed in front of the camera unit 13; and the water repelling portion 121 which is formed in step form in the tip portion 133 of the visor 19 in such a manner that the tip of the inner circumferential surface 137 of the visor 19 recedes from the tip of the outer circumferential surface 135 of the visor 19 in the direction opposite to projection of the visor 19.

Figure 21:
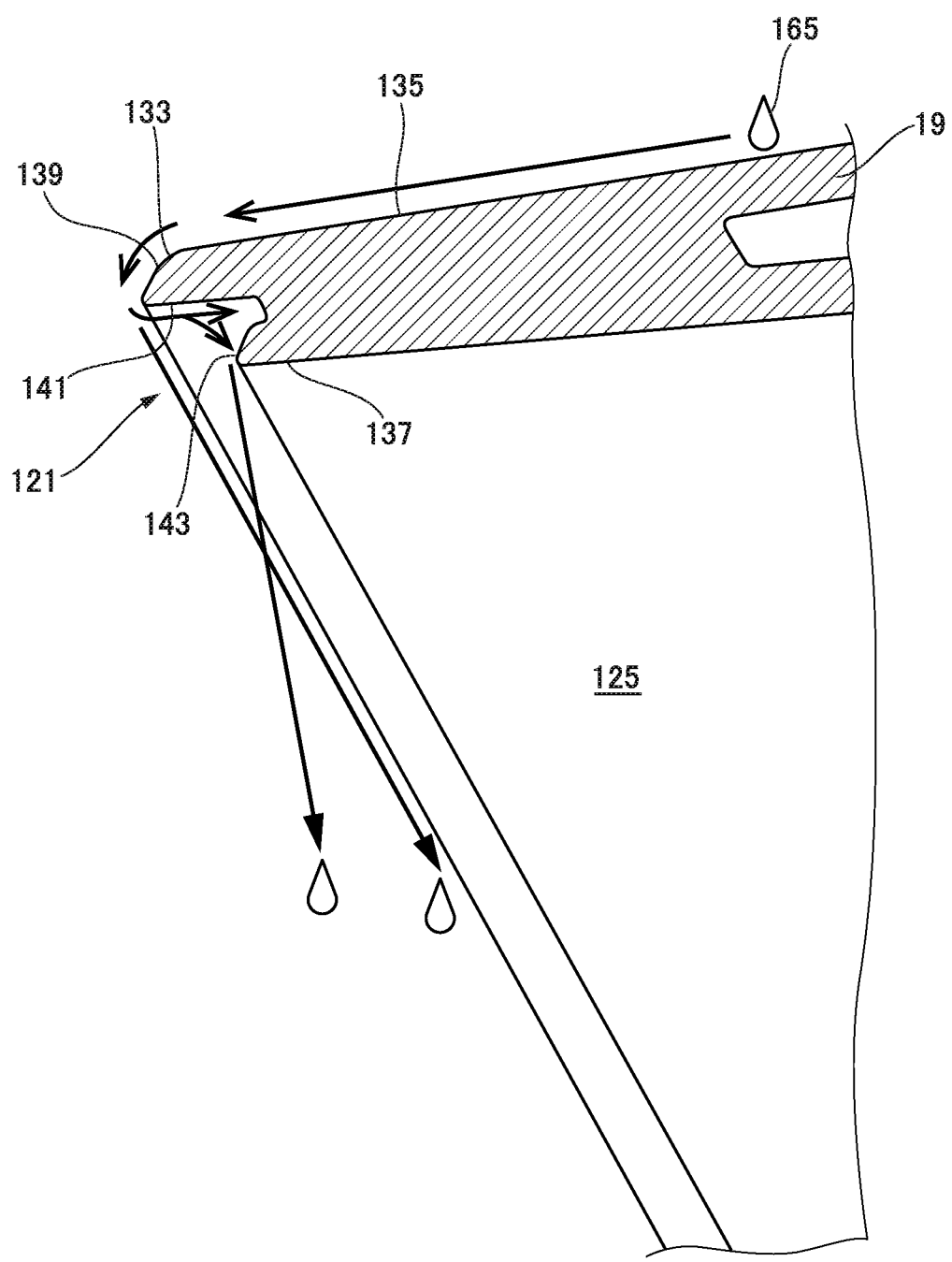
FIG. 21 is a sectional view illustrating how rainwater flows in the visor.

FIG. 21 is a sectional view illustrating how rainwater flows in the visor 19. In the surveillance camera 119 according to the second embodiment, the front surface of the main body 17 is provided with the visor 19. The visor 19 projects from the front surface of the main body 17 which projects from the front surface of the main body 17 so as to be inclined forward and covers, from above, the light-receiving space 125 formed in front of the camera unit 13. The water repelling portion 121 is formed in the tip portion 133 of the visor 19. The water repelling portion 121 is formed in step form in such a manner that the tip of the inner circumferential surface 137 of the visor 19 recedes from the tip of the outer circumferential surface 135 of the visor 19 in the direction opposite to projection of the visor 19.

Since the visor 19 extends so as to be inclined forward, when rain falls on the outer circumferential surface 135, rainwater 165 flows toward the tip portion 133. At the tip portion 133, the rainwater 165 tends to go to the inner circumferential surface 137 due to surface tension and kinetic energy given by a wind but hits the step-shaped water repelling portion 121 and is prevented from going deep beyond it. In this manner, it is more difficult for rainwater 165 to deep into the visor 19 than in a case that the tip portion of the visor 19 is simply rounded: the degree of sticking of rainwater 165 to the glass plate 153 is lowered.

Since the step-shaped water repelling portion 121 is narrow, the volume of each waterdrop formed in the tip portion 133 and is to fall from there is made small. If the volume of each of waterdrops that stick to the tip portion 133 temporarily is large, rain hits those waterdrops and scatter them due to the energy of collision. Scattered rain drops likely stick to the glass plate 153. In the visor 19 which is formed with the water repelling portion 121, waterdrops can be made smaller than in a case that the tip portion of the visor 19 is simply rounded in cross section and hence the amount of waterdrops scattered to reach the glass plate 153 is made smaller.

As a result, in the surveillance camera 119, the amount of rainwater 165 sticking to the glass plate 153 is reduced, whereby stains are less prone to be formed on the glass plate 153 and reduction of the transmittance of imaging light is suppressed: it becomes possible to maintain high imaging quality for a long time. As such, the surveillance camera 119 according to the second embodiment can suppress lowering of the imaging quality.

In the surveillance camera 119, the water repelling portion 121 has the first tip surface 139 that is connected to the outer circumferential surface 135, the tip bottom surface 141 that is connected to and bends inside the first tip surface 139, and the second tip surface 143 that is connected to the inner circumferential surface 137, wherein the tip bottom surface 141 and the second tip surface 143 form the acute angle $\theta b$.

In this surveillance camera 119, when rain falls on the outer circumferential surface 135, rainwater 165 flows to the first tip surface 139 and goes around it to reach the tip bottom surface 141 due to surface tension and kinetic energy given by a wind. The rainwater 165 then hits the second tip surface 143 and is prevented from going deep and reaching the inner circumferential surface 137. In this action, since the angle $\theta b$ formed by the tip bottom surface 141 and the second tip surface 143 is an acute angle, the second tip surface 143 resists movement of the rainwater 165 to the inner circumferential surface 137. Thus, the damming effect of the water repelling portion 121 for preventing rainwater 165 from reaching the inner circumferential surface 137 can be made stronger than in a case that the angle $\theta b$ is an obtuse angle. As a result, rainwater 165 drops from the second tip surface 143 efficiently and is not prone to stick to the glass plate 153.

In the surveillance camera 119, the visor 19 is shaped like an inverted-U-shaped gutter that is open at the bottom.

In this surveillance camera 119, the visor 19 is shaped like an inverted-U-shaped gutter. Since the visor 19 is inverted-U-shaped, bottom portions on the two respective sides go down approximately parallel with each other unlike in a cylindrical visor. Thus, to cause rainwater 165 sticking to the tip portion 133 to flow downward, it is not necessary to make the tip portion 133 closer to the glass plate 153 unlike in the case of a cylindrical visor. As a result, rainwater 165 flowing along the tip portion 133 is less prone to stick to the glass plate 153.

In the surveillance camera 119, the visor 19 has the bottom tip portion 149 that recedes from the top tip portion 151 in the direction opposite to projection of the visor 19.

In this surveillance camera 119, the bottom tip portions 149 recede from the top tip portion 151 in the direction opposite to projection of the visor 19. The surveillance camera 119 is installed at a height H that is greater than the height hf of a subject (e.g., vehicle C; see FIG. 4). That is, the surveillance camera 119 is installed so that the dip angle $\theta v$ (see FIG. 4) with respect to the horizontal direction is equal to about 7° to 14°, for example. Thus, since the bottom tip portion 149 recedes from the top tip portion 151 of the visor 19, it is easier for the surveillance camera 119 to receive imaging light coming from a position that is located below and deviated in the horizontal direction (like the imaging direction shown in FIG. 5). This makes it possible to secure a wider imaging range than in a case that the bottom tip portions (149) exist in the same vertical plane as the top tip portion 151.

In the surveillance camera 119, the glass plate 153 which covers the lens 21 of the camera unit 13 is disposed deep inside the visor 19 so as to be inclined forward with respect to the imaginary line 157 that is perpendicular to the optical axis 155 of the lens 21.

In this surveillance camera 119, the glass plate 153 which covers the lens 21 of the camera unit 13 is disposed deep inside the visor 19. For example, the camera unit 13 is installed so as to have such a forward-inclined posture that the optical axis 155 of the lens 21 has the dip angle $\theta v$ (see FIG. 4) with respect to the horizontal line. The glass plate 153 is further inclined forward so as to form the angle $\theta z$ (see FIG. 18) with the imaginary line 157 that is perpendicular to the optical axis 155 of the lens 21. In the camera unit 13, if the glass plate 153 were perpendicular to the optical axis 155 of the lens 21, what is called a ghost would occur in an image taken due to refraction of light coming from a subject when it passes through the glass plate 153. In the surveillance camera 119, since the glass plate 153 is inclined forward with respect to the imaginary line 157 that is perpendicular to the optical axis 155, unnecessary light that would otherwise cause a ghost can be directed to outside the angle of view of the imaging device. As a result, in the surveillance camera 119, the probability of occurrence of a ghost is lowered and corresponding reduction of imaging quality can be suppressed.

In the surveillance camera 119, the camera unit opening 65 where the bottom plate portion 159 is provided is formed in the main body front portion 57 of the main body 17 and the bottom plate tip portion 161, exposed as a result of retreat of a bottom portion of the glass plate 153 because of its inclination, of the bottom plate portion 159 is formed with the cut 123 right under the illuminance sensor 163 provided under the glass plate 153.

In this surveillance camera 119, the IR cutting filter and the raw glass member are disposed so as to be able to be switched by the above-mentioned filter switching mechanism 73. In the daytime mode, the filter switching mechanism 73 causes the imaging device to receive RGB light by cutting an IR component and to thereby produce a visible light image that is high in image quality. On the other hand, in the nighttime mode, the filter switching mechanism 73 causes the imaging device to receive incident light by not cutting an IR component and to thereby produce an IR image having a certain level of brightness. In the filter switching mechanism 73, the switching between the daytime mode and the nighttime mode is controlled according a detection value of the illuminance sensor 163.

Figure 22:
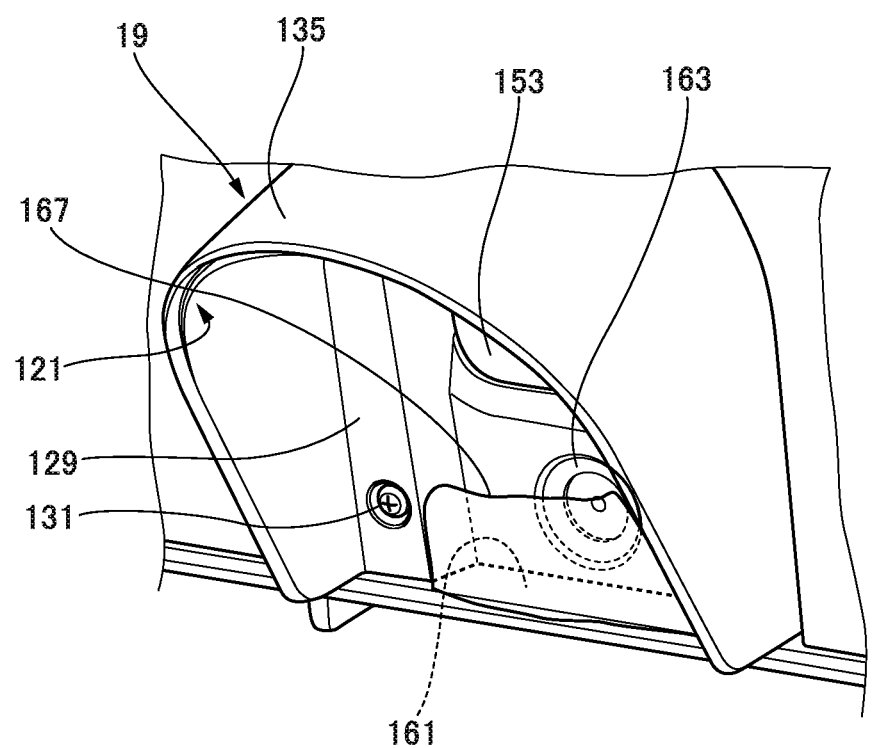
FIG. 22 is a perspective view showing how snow sticks in the case where bottom plate portion is not formed with a cut.

FIG. 22 is a perspective view showing how snow 167 sticks in the case where the bottom plate portion 159 is not formed with the cut 123. Incidentally, to avoid influence from the illumination unit 15, the illuminance sensor 163 is provided below the camera unit 13, that is, on the side opposite to the illumination unit 15 with the camera unit 13 interposed between them. On the other hand, in the camera unit 13, to suppress occurrence of a ghost, the glass plate 153 is disposed so as to be inclined forward. Since the glass plate 153 is inclined forward and hence a lower end portion of the glass plate 153 retreats, the bottom plate tip portion 161 is exposed in the camera unit opening 65.

If snow 167 lies on the bottom plate tip portion 161 during snowing as shown in FIG. 22, the illuminance sensor 163 may be covered with the snow 167. If the detection by the illuminance sensor 163 becomes unstable, the filter switching mechanism 73 does not operate normally, as a result of which proper incident light cannot be obtained and the imaging quality is degraded.

In view of the above, in the surveillance camera 119, as shown in FIG. 20, the bottom plate tip portion 161 which is exposed right under the illuminance sensor 163 is formed with the cut 123. The cut 123 causes snow 167 to fall instead of lying there. With this measure, even though the surveillance camera 119 has the structure that the glass plate 153 is inclined forward to suppress occurrence of a ghost, the illuminance sensor 163 is prevented from suffering an operation failure and reduction in imaging quality due to snowing.

Although the embodiments have been described above with reference to the accompanying drawings, it goes without saying that the disclosure is not limited to them. It is apparent that those skilled in the art could conceive various changes, modifications, replacements, additions, deletions, or equivalents within the confines of the claims, and they are construed as being included in the technical scope of the disclosure. Constituent elements of the above-described embodiments can be combined in a desired manner without departing the spirit and scope of the invention.

What is claimed is:

1. A surveillance camera comprising:
   a capturing unit that is configured to capture a subject;
   an illumination unit that applies illumination light to the subject;
   a main body that is approximately formed in a cuboid that is long in a top-bottom direction and has an internal housing space that houses the capturing unit and the illumination unit;
   a visor that projects from a front surface of the main body so as to be inclined forward and covers, from above, a light-receiving space formed in front of the capturing unit; and
   a step-shaped water repelling portion that is defined in a protrusion tip portion of the visor in such a manner that a tip inner circumferential surface of the visor recedes from a tip of an outer circumferential surface of the visor in a direction opposite to the projection of the visor.

2. A surveillance camera comprising:
   a capturing unit that is configured to capture a subject;
   an illumination unit that applies illumination light to the subject;
   a main body that is approximately formed in a cuboid that is long in a top-bottom direction and has an internal housing space that houses the capturing unit and the illumination unit;
   a visor that projects from a front surface of the main body so as to be inclined forward and covers, from above, a light-receiving space formed in front of the capturing unit; and
   a step-shaped water repelling portion that is defined in a protrusion tip portion of the visor in such a manner that a tip inner circumferential surface of the visor recedes from a tip of an outer circumferential surface of the visor in a direction opposite to the projection of the visor, wherein
   the water repelling portion has
     a first tip surface that is connected to the tip outer circumferential surface,
     a tip bottom surface that is connected to and bends inward from the first tip surface and
     a second tip surface that is connected to the tip inner circumferential surface, and
     the tip bottom surface and the second tip surface form an acute angle.

3. The surveillance camera according to claim 1, wherein:
   the visor is formed in an inverted-U-shaped gutter that is open at the bottom.

4. The surveillance camera according to claim 1, wherein:
   the visor has
     a top protrusion tip portion and
     a bottom protrusion tip portion that recedes from the top protrusion tip portion in the direction opposite to projection of the visor.

5. A surveillance camera comprising:
   a capturing unit that is configured to capture a subject;
   an illumination unit that applies illumination light to the subject;
   a main body that is approximately formed in a cuboid that is long in a top-bottom direction and has an internal housing space that houses the capturing unit and the illumination unit;
   a visor that projects from a front surface of the main body so as to be inclined forward and covers, from above, a light-receiving space formed in front of the capturing unit; and
   a step-shaped water repelling portion that is defined in a protrusion tip portion of the visor in such a manner that a tip inner circumferential surface of the visor recedes from a tip of an outer circumferential surface of the visor in direction opposite to the projection of the visor, wherein
   a glass plate which covers a lens of the capturing unit is disposed inside the visor so as to be inclined forward with respect to an imaginary line that is perpendicular to an optical axis of the lens.

6. The surveillance camera according to claim 5, wherein:
   a capturing unit opening where a bottom plate portion is provided is formed in a main body front portion of the main body; and
   a bottom plate tip portion of the bottom plate portion is exposed as a result of forward inclination of the glass plate and retreat of a bottom portion of the glass plate, the bottom plate being formed with a cut right under an illuminance sensor provided under the glass plate.

7. A surveillance camera comprising:
   a capturing unit that is configured to capture a subject;
   an illumination unit that applies illumination light to the subject;
   a main body that has an internal housing space that houses the capturing unit and the illumination unit;
   a visor that projects from a front surface of the main body so as to be inclined forward and covers, from above, a light-receiving space formed in front of the capturing unit; and
   a step-shaped water repelling portion that is defined in a protrusion tip portion of the visor in such a manner that a tip of an outer circumferential surface of the visor projects further outward from the main body than a tip inner circumferential surface of the visor.

8. A surveillance camera comprising:
a capturing unit that is configured to capture a subject;
an illumination unit that applies illumination light to the subject;
a main body that has an internal housing space that houses the capturing unit and the illumination unit;
a visor that projects from a front surface of the main body so as to be inclined forward and covers, from above, a light-receiving space formed in front of the capturing unit; and
a step-shaped water repelling portion that is defined in a protrusion tip portion of the visor and includes a groove disposed between an outer circumferential surface of the visor and a tip inner circumferential surface of the visor to prevent liquid accumulating on the visor from traveling to the inner circumferential surface and toward the main body.

* * * * *